United States Patent [19]

Benes et al.

[11] Patent Number: 5,225,089
[45] Date of Patent: Jul. 6, 1993

[54] METHOD AND APPARATUS FOR SEPARATING PARTICLES

[76] Inventors: Ewald Benes, Klosterstrasse 23, A-2362 Biedermannsdorf (NÖ); Ferdinand Hager, Berggasse 8/18, A-1090 Wien, both of Austria

[21] Appl. No.: 474,813
[22] PCT Filed: Nov. 3, 1989
[86] PCT No.: PCT/AT89/00098
 § 371 Date: Jul. 3, 1990
 § 102(e) Date: Jul. 3, 1990
[87] PCT Pub. No.: WO90/05008
 PCT Pub. Date: May 17, 1990

[30] Foreign Application Priority Data
Nov. 3, 1988 [AU] Australia ............... 2712/88

[51] Int. Cl.[5] .......................... B01D 17/06
[52] U.S. Cl. .................... 210/748; 210/702; 210/738; 210/188; 55/15; 55/277; 366/127; 406/198
[58] Field of Search ............... 210/702, 718, 738, 748, 210/749, 927, DIG. 5, 188; 198/630; 209/345, 422; 406/168, 197, 198; 366/127; 422/20; 55/15, 277

[56] References Cited

U.S. PATENT DOCUMENTS

| | | |
|---|---|---|
| 4,055,491 | 9/1977 | Porath-Furedi .............. 210/748 |
| 4,280,823 | 7/1981 | Szonntagh ................ 209/1 |
| 4,398,925 | 8/1983 | Trinh et al. ............... 210/748 |
| 4,523,682 | 6/1985 | Barmatz et al. . |
| 4,673,512 | 6/1987 | Schram . |
| 4,759,775 | 7/1988 | Peterson et al. ............ 210/738 |

FOREIGN PATENT DOCUMENTS

| | | |
|---|---|---|
| 0173435 | 5/1980 | European Pat. Off. . |
| 0059359 | 8/1982 | European Pat. Off. . |
| 3027433 | 7/1980 | Fed. Rep. of Germany . |
| WO87/0718 | 12/1987 | PCT Int'l Appl. . |
| WO88/09210 | 12/1988 | PCT Int'l Appl. . |
| 2098498 | 11/1982 | United Kingdom . |

Primary Examiner—Robert A. Dawson
Assistant Examiner—David Reifsnyder
Attorney, Agent, or Firm—Watson, Cole, Grindle & Watson

[57] ABSTRACT

Method and apparatus for separating particles (1) which are dispersed in a dispersion medium, whereby an ultrasonic standing wave (3) is generated by means of a composite resonator in a vessel (8) containing dispersion (2), the frequency of said wave preferably being in the neighborhood of the characteristic frequency ($f_o$). In order to achieve a better separation of the particles it is provided that the amplitudes (V) of the sound particle velocity which appear in the sound field are chosen slightly smaller than the upper threshold amplitude ($V_{max}$), and that pressure forces on the dispersed particles (1), which result from the acoustic stream of the dispersion medium caused by applied sound, are equivalent to the longitudinal holding forces of the dispersed particles (1) in the areas of the antinodes (11) and nodes (12), and furthermore that the frequency by means of which the composite resonator is driven is as precisely as possible tuned to one of the resonant frequencies ($f_n$).

21 Claims, 9 Drawing Sheets

FIG. 13a
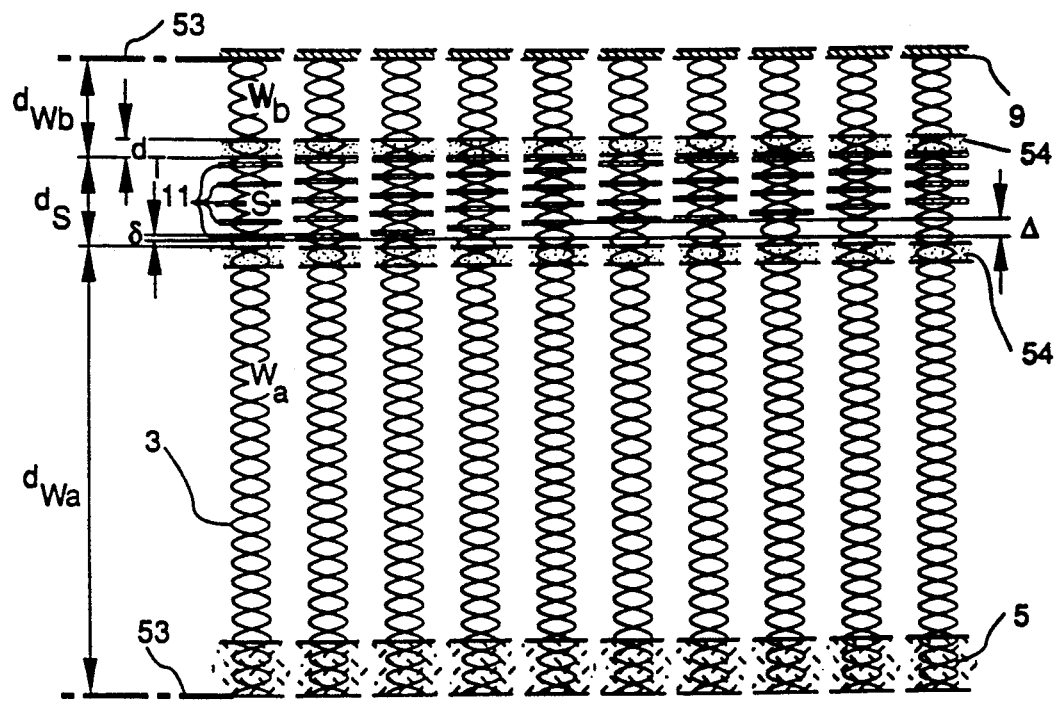
$t_n \to t_{n+1}$  $N\lambda_n/2 \to (N+1)\lambda_{n+1}/2$
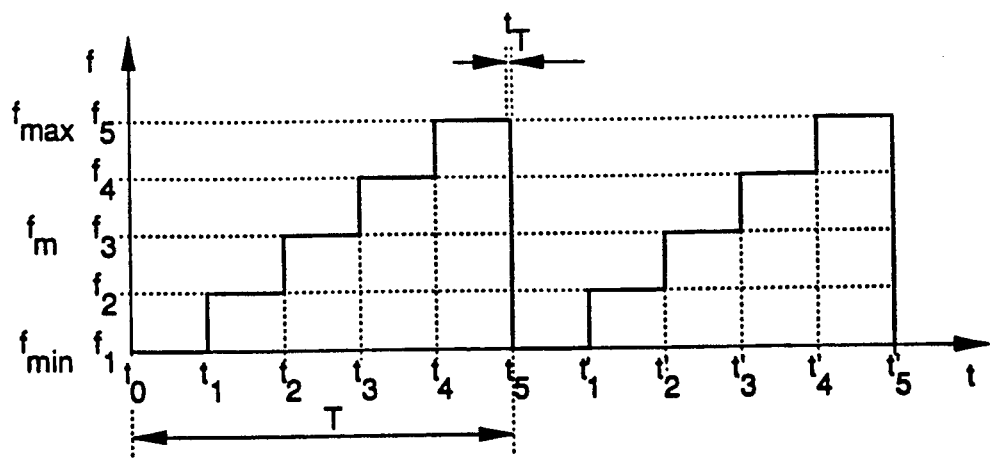
FIG. 13b

METHOD AND APPARATUS FOR SEPARATING PARTICLES

BACKGROUND OF THE INVENTION

The invention refers to a method for separating particles which are dispersed in a dispersion medium, whereby an ultrasonic standing wave is generated by means of a composite resonator within a vessel carrying the dispersion. The frequency of the wave is preferably within the neighborhood of the characteristic frequency $f_o$. The term dispersion is used here as a general term for all kinds of disperse systems. This concerns a system consisting of two (or several) phases in which the disperse phase is finely distributed in the other one, hereinafter referred to as dispersion medium or dispersion.

Whereas the invention is applicable to all types of particles (solid, liquid or gaseous disperse phases), there is a limitation in the dispersion medium to liquids or gases. The application hereby comprises both solid (suspensions), liquid (emulsions), and gaseous particles in liquids and solid (smoke) and liquid particles (fog) in gases. Naturally, the liquid can also be a molten mass. The widest field of application are hydrosoles (particles in water) and aerosoles (particles in air).

STATE OF THE ART

The precipitation of dispersed particles on a commercial scale has been achieved up to the present day by so-called flotation or by addition of so called flocculators. Flotation is limited to relatively heavy particles and flocculators chemically contaminate the dispersion, and thus cause problems in the treatment of drinking water.

Whereas the disperse and colloidal effects of ultrasonics and cleaning by means of ultrasonics are widely applied in industry, the coagulating effect of ultrasonic sound is prominently known from literature. From E. Skudrzyk, "Die Grundlagen der Akustik", Springer verlag, Wien, 1954, S. 202-205, S. 807-825; L. Bergmann "Der Ultraschall und seine Anwendung in Wissenschaft und Technik", Verlag Hirzel, Zürich, 1954; as well as K. Asai and N. Sasaki, Proceedings of the 3rd International Congress on Coal Preparation, Institut National de L'Industrie Charbonniere, Brussels-Liege, 1958, "Treatment of slick by means of ultrasonics" it follows that the frequency to be used in the applied sound is best chosen within the magnitude of the so-called characteristic frequency $f_o$, which can be calculated from $$f_0 = \frac{3}{2\pi} \frac{\overline{\eta}}{r^2} = 0.4775 \frac{\overline{\eta}}{r^2} \quad [1]$$

whereby $$\overline{\eta} = \frac{\eta}{\rho} \quad [2]$$

constitutes the kinematic viscosity, $\eta$ the dynamic viscosity, $\rho$ the density of the dispersion medium, and r the radius of the particle. The inner friction is practically without importance for frequencies above $f_o$, for frequencies below, however, it becomes decisive.

The characterstic frequency also defines the so-called particle velocity accordance coefficient which is the ratio between the particle velocity amplitude of the particle and the dispersion medium. In the neighborhood of the characteristic frequency the particle begins to display a measurably lower displacement than the molecules of the dispersion medium; when increasingly exceeding the characteristic frequency, the particles are less and less carried along by the sound waves. As the so-called hydrodynamic or Bernoulli forces, which contribute considerably to the coagulation of particles within the areas of the particle velocity nodes and antinodes, directly depend on the occurrence of a relative movement between particles and dispersion medium, it is normally preferable to choose the frequency of excitation higher than the characteristic frequency. In this case an increase of the frequency of more than ten times the characteristic frequency practically no longer leads to an increase of the relative movement, as the displacement of particles, related to the sound amplitude in the dispersion medium, moves towards a limit. The limit depends on the density ratio $\rho'/\rho$ between particle and dispersion medium, and is achieved for a small value (e g. of gas bubbles in water) of $\rho'/\rho$ at a later time (at approx. 10 $f_o$) and for a very high value (e.g. mineral matters or metal dust in water) at an earlier time (at approx. 0.3 $f_o$). From specialized literature it therefore follows that the applied sound frequency is to be chosen within the magnitude of 0.3 $f_o$ to 10$f_o$ if the hydrodynamic or Bernoulli forces are to be exploited for the coagulation. For the magnitude of the sound radiation force, which drives the particles to the extrema (nodes and antinodes) of the sound particle velocity, the applied sound frequency is of secondary importance. The decisive value therefor is the so-called acoustic response factor which depends on the ratio of the particle to fluid density, and the ratio of the longitudinal sound velocity in the particle to that in the fluid. If the acoustic response factor is positive, the particles are pushed into the antinodes. If, however, the factor is negative, the particles are pushed into the nodes. When the acoustic response factor becomes zero, the sound radiation forces disappear. In the majority of hydrosoles the particles are driven into the antinodes.

In the past considerable efforts were undertaken in order to make this method effective and thus applicable on a commercial scale. The U.S. Pat. No. 4,055,491 shows an example of such a technical arrangement in which the dispersed particles are flocculated in an ultrasonic standing wave. Subsequently, during a phase in which the ultrasonic energy was turned off, the particles settled by means of gravity. Although the rate of sedimentation may be increased compared with that of natural sedimentation, this method is, nevertheless, still very slow and not suitable for large amounts to be treated. It need not be stressed that this method is preferable in discontinuous operation and thus not suitable for many fields of application.

A further arrangement in accordance with U.S. Pat. No. 4,398,925 provides the removal of gas bubbles from liquids, whereby in the arrangement first an ultrasonic standing wave is generated in such manner as to produce a sound particle velocity extremum in the center of the liquid-containing vessel. In the extremum the gas bubbles assemble and are forced to coagulate. Subsequently the generation of the ultrasonic wave is interrupted, causing the gas bubbles, which have increased in size as a consequence of the coagulation, to slowly rise due to buoyancy forces. After having left the area of the sound particle velocity extremum, a second ultrasonic standing wave is generated with such increased frequency that two areas of sound particle velocity extrema come about. The rising gas bubbles are thus forced to move to the nearest extremum, i.e., the one located above. This process can, by applying constantly increasing frequencies, be repeated until the gas bubbles dissolve on the surface of the liquid. It is hereby pointed out that this method relies on the presence of a non-acoustic force, the buoyancy force, which acts on the gas bubbles during the phase in which the ultrasonic force is turned off. Only this measure can prevent the gas bubbles from being scattered into several partial areas of the sound particle velocity extrema, thus preventing a well-directed and extensive separation. Furthermore this process is extremely slow due to continuously interrupting the application of sound. It need not be pointed out that such a method is not suitable for operations with flowing liquids.

The application of ultrasonic standing waves is also used for separating particles with various acoustic qualities, as is described in U.S. Pat. No. 4,280,823 and U.S. Pat. No. 4,523,682. In these cases the fact that on miscellaneous particles (differences in density, speed of sound, size . . . ) acoustic forces act differently is utilized. The disadvantage of this method lies in the fact that a further non-acoustic force—such as gravity or frictional force—is necessary in order to achieve a successful separation. Furthermore, both patents rely on having permanently and consistently constant acoustic environments. This demand can hardly be fulfilled in practice due to interference phenomena, uneven oscillation of the sound generating elements, and temperature, flow and other effects.

The mutuality of the above methods lies in the fact that, on the one hand, they generate microscopic areas of increased particle concentration (areas of antinodes and nodes), whereas, on the other hand, they only truly generate a macroscopical separation, i.e., one which extends across several wave lengths, by means of a non-acoustic force, mostly gravity. Consequently this method has proved to be very slow.

The arrangements in accordance with British Patent No. 2,098,498A and U.S. Pat. No. 4,673,512 try to generate a relative movement of the areas in which the particles assemble in the ultrasonic standing wave. This movement is brought about in that a first ultrasonic moving wave is radiated in one direction and that the first wave is superimposed by a second ultrasonic moving wave having the same frequency, moving in the opposite direction and being distinguished from the first wave by a consistently changing phase relation. The result of this superimposition is a drifting standing wave with moving areas in the sound particle velocity extrema. When a dispersion flows through the area of the drifting standing wave, the dispersed particles are, depending on their acoustic properties, more or less moved in combination with the extrema, thus achieving the desired separation effect. The considerable disadvantage of the two patents is due to the fact that only very little separation occurs, as the generation of a drifting standing wave by means of continuously changing the phases of two ultrasonic moving waves drifting apart in opposite directions cannot take place in a resonant condition. This leads to extremely low acoustic forces (with a factor of $10^6$ lower than during resonant operation), thus strongly reducing the amount which is separated and requiring enormous electrical power, which considerably limits its application in industry.

Patent PCT/AT88/00034 discloses the use of a common standing wave for flocculation, sedimentation, agglomeration and coagulation of particles dispersed in a liquid, whereby, in contrast to U.S. Pat. No. 4,055,491, operation with flowing liquids is included therein. Both, however, have the disadvantage that the dispersed particles are to be agglomerated or coagulated to larger particles in order to allow sedimentation of said particles by means of gravity within an acceptable timeframe. The necessity of coagulation requires the sound energy to be applied for long periods and consequently entails small flow rates. A further arrangement of the Patent PCT/AT88/00034 comprises the generation of a drifting standing wave by means of superimposing two waves moving in opposite directions, said waves having the same frequency, but a continuously changing phase relation, for the purpose of coagulating particles. Resonant operation is consequently not possible and entails all the known disadvantages.

The U.S. Pat. No. 4,759,775 also attempts to achieve a movement and separation of the dispersed particles by means of a drifting standing wave. In contrast to the above described British Patent No. 2,098,498A, U.S. Pat. No. 4,673,512 and PCT/AT88/00034, the drifting movement is not realised by means of shifting the phases of two waves of the same frequency moving in opposite directions, but by two other methodical variations.

The first method achieves the drifting movement by superimposing two waves which move in opposite directions and have slightly different frequencies. The difference in the frequency is achieved either by exploiting the acoustic Doppler effect by continuously moving the reflector or by using two transducers which emit, in opposite directions, two moving waves of slightly different frequencies.

The second method comprises the excitation of a transducer in such a manner as to continuously increase or decrease the applied frequency between two threshold frequencies and to subsequently return back to the initial frequency. These two steps are then continuously repeated. The superimposition of said wave, which expands in one direction and whose frequency constantly changes, with a wave reflected in a fixed acoustic mirror in the opposite direction causes a drifting standing wave due to the difference in run-time.

The efficiency of both methods is limited due to the fact that the generation of a drifting standing wave is only possible by giving up resonant operation with all disadvantages described above.

A last arrangement of U.S. Pat. No. 4,759,775 aims at generating not a drifting standing wave, but a true standing wave by means of synchronizing a continuous frequency shift of the radiated wave with a simultaneous movement of the reflector. The change in frequency of the wave reaching the reflector is compensated for as a consequence of the Doppler effect, said effect being caused by the movement of the reflector. Here the number of wave lengths remains constant, only the wave length itself, and thus the total length of the distance to which sound is applied, changes. The disadvantage of this method lies in the fact that the desired separation effect is not achieved, as the particles held in the antinode areas are distributed amongst the whole volume area and thus no extensive separation of particles and dispersion medium occurs. Furthermore, it is extremely difficult to bring about exact synchronization of the necessary reflector movements with the respective changes in frequency. Consequently, the absolute necessity of an energetically favorable resonant condition cannot be maintained. A continuous operation with flowing liquids is hardly imaginable due to the fact that during the phase in which the reflector returns to its starting position the generation of sound waves—and thus the flow of the liquid—has to be interrupted.

DESCRIPTION OF THE INVENTION

It is the object of the invention to create a method which avoids the above disadvantages and enables a total separation of dispersed particles from a dispersion medium, or a separation of different particles.

In accordance with the invention this is achieved in that the amplitudes V of the sound particle velocity which appear in the sound field are chosen slightly smaller than the upper threshold amplitude $V_{max}$, and that pressure forces on the dispersed particles, which result from the acoustic stream of the dispersion medium caused by the application of sound, are equal to the longitudinal holding forces of the dispersed Particles in the areas of the nodes and antinodes, and furthermore that the frequency by means of which the composite resonator is driven is as precisely as possible tuned to one of the resonant frequencies $f_n$. In the case that a plane standing wave is applied, the areas of nodes and antinodes have the form of planes.

The determination of the upper threshold amplitude is achieved easiest by increasing the amplitude of the electric excitation voltage until the acoustic stream pulls along the particles assembled in the areas of the nodes and antinodes as a consequence of the sound radiation forces. This usually takes place very spontaneously und can usually be seen very well by using—if necessary—a magnifying glass or a microscope. In addition to this, the supervision of the optical transmission factor of the dispersion in a direction which is parallel to the areas of the nodes and antinodes clearly shows when the threshold amplitude has been reached (sudden and significant reduction of the transmission factor), thus allowing the adjustment of the sound particle velocity amplitude to the inventive value. In cases where optical supervision is not possible (e.g. transparent particles whose refraction coefficient is not different to that of the dispersion medium), such supervision can occur by determining the yield gained from sedimentation in relationship to the size of the electric excitation voltage. The sedimentation yield increases at first in relationship with the increasing excitation voltage. When $V_{max}$ is exceeded, the yield suddenly drops to a minuscle value. The determination of the sedimentation yield may occur, for example, by weighing the precipitated particles.

In the case of very low concentrations of particles, those concentrated in the areas of the nodes and antinodes can still be located at such big distances as not to allow coagulation to larger particles. In accordance with a further feature of the invention, two standing fields of waves may be generated by applying two-dimensional sound, said waves preferably forming a right angle, thus causing the particles, by means of longitudinal forces, to be driven into and held in the lines of intersection of the areas of nodes and antinodes. Even in the case of low concentrations of particles in the volume there is sufficient concentration for allowing coagulation in the node lines and antinode lines. In this arrangement the excitation frequencies of both dimensions can be chosen differently. This is particularly preferable in the case that the particles are of various sizes to which, according to equation [1], considerably varying frequencies can be attributed.

In the case of particularly low concentrations of particles or strongly varying sizes of particles, a variation of the invention is preferable in that three standing fields of waves are generated, these waves preferably forming right angles, thus causing the particles, by means of longitudinal forces, to be driven into and held in the point of intersection between the areas of the nodes and antinodes.

In order to achieve both further concentration of the particles within the areas of the nodes and antinodes, and holding the particles also in a lateral direction which is in a normal line towards the longitudinal forces, the invention comprises the generation of lateral forces on the particles, these forces showing in the direction of rising amplitudes. This is achieved by the formation of characteristic gradients of the particle velocity amplitude within the areas of the nodes and antinodes or within the lines of intersection of the areas of the nodes and antinodes. Consequently, these forces hold the particles in the zones of the areas of nodes and antinodes, or the lines of intersection respectively, in which the particle velocity amplitude has relative local maxima.

It is preferably provided to form characteristic gradients of the particle velocity amplitude V within the areas of the nodes and antinodes by means of an alternating sequence of zones with constructive and destructive interference, thereby causing the amplitudes of the sound particle velocity to vary between relative local maximum and minimum values.

When the field of sound is static with regard to the vessel, there is the disadvantage that, on the one hand, the particles are concentrated in the areas of the nodes and antinodes, but, on the other hand, a macroscopic separation is thereby not yet achieved (due to the very low distances between the areas of node and antinode of typically less than one mm). The present measures, however, will only lead to results if the particles are able to coagulate into sufficiently large conglomerates, which can then be settled by means of gravity. Sedimentation by means of gravity requires considerable amounts of time, which consequently entails that per volume unit sound has to be applied for long periods of time and requires large amounts of energy. A further particularly important feature of the invention comprises the standing field of sound, which occurs through the resonant frequency in the vessel, to be displaced relating to the vessel. In a suitable arrangement of the field of sound, the particles are held in a kind of "acoustic bottle". The mentioned disadvantages are overcome by moving the acoustic bottle, and thus the particles, relating to the vessel containing the dispersion medium. Consequently, a fast macroscopic separation of the dispersed particles from the dispersion medium is achieved. The relative displacement required therefor may preferably take place in a normal line towards the direction of propagation or the wave's direction of propagation, whereby the latter option will enable fast separation.

Furthermore, the invention refers to an apparatus for separating dispersed particles by applying sound by means of ultrasonic standing waves to a dispersion medium, the waves being generated by a composite resonator having a transducer The transducer comprises at least one mechanically oscillating element being electrically driven at a frequency in the neighborhood of the characteristic frequency $f_o$ and being acoustically coupled with the vessel containing the dispersion medium, the vessel having rigid walls preferably reflecting sound waves, by means of which standing sound waves can be formed. The standing waves generate sound radiation forces in the longitudinal direction of the standing waves, which both drive the particles into and hold them in the areas of the antinodes, or nodes respectively, of the standing field of sound (longitudinal holding forces). This apparatus is characterized in that amplitudes V of the sound particle velocity arising in the sound field are adjusted to a value which is slightly smaller than the upper threshold value $V_{max}$ and that pressure forces on the dispersed particles, which arise due to the acoustic flow—which is generated by the application of sound—of the dispersion medium, are equal to the longitudinal holding forces of the dispersed particles in the areas of nodes and antinodes, and that, furthermore, the applied frequency of the composite resonator is tuned as precisely as possible to one or several of its resonant frequencies $f_n$ by respective tuning of the electric excitation frequency. By choosing such an amplitude of the sound particle velocity arising in the sound field and by precise tuning of the excitation frequency to the resonant frequency of the composite resonator, one achieves a particularly good coagulation of particles.

In particular, when encountering low concentrations of particles, one specific arrangement of the invention is preferable in that two or three transducers are used which approximately form a right angle to each other. The areas of nodes and antinodes thus arising have a smaller volume, causing a considerably higher concentration of the particles in the areas.

The invention further comprises the realisation of the acoustic mirror by means of a disc with plan-parallel surfaces made from a material being, in comparison to the dispersion, as reverbant as possible. The thickness of the disc is preferably chosen equal to a quarter or equal to an uneven multiple of a quarter of the wavelength $(2n+1)\lambda/4$ in the disc.

The reflection of the acoustic wave by 180° is preferably achieved by means of a mirror system whose individual mirror surfaces form a right angle, thus causing the waves impinging the mirror to not penetrate the reflector material and to prevent losses in energy, insofar as the angle between incident wave and surface of the reflector exceeds both the critical angle for total relection of longitudinal waves $\theta_l$ and the critical angle for total reflection of the shear waves $\theta_s$ $$\theta_l = \arcsin \frac{c_{fl}}{c_l}, \quad [3]$$

$$\theta_s = \arcsin \frac{c_{fl}}{c_s}$$

$c_{fl}$ ... speed of sound in the dispersion
$c_l$ ... speed of sound of the longitudinal wave in the reflector material $c_s$ ... speed of sound of the shear wave in the reflector material.

Furthermore, the right-angled arrangement of the reflectors brings about that the path for all impinging waves remains the same after reflection on two or more reflectors, independent of the point of impingement on the first reflector. Thus the necessary phase consistency of the acoustic wave during the reflection is guaranteed. The angle between the incident wave and the surface of the mirror preferably is chosen at 45°. The conditions for the critical angle, as is stated in formula [3], for total reflection of most solids, in particular metals such a aluminium and iron, are fulfilled by this angle.

In particular the invention provides that the acoustic mirrors simultaneously fulfill the function of the walls of the vessel or parts thereof.

A two-dimensional application of sound may also be achieved in accordance with the invention by using a single transducer, the transducer sending a wave in a first direction and generating sound waves by means of an acoustic mirror system, the sound waves preferably forming a 90° angle in relationship to the first direction.

The invention also comprises particularly effective measures leading to the formation of a distinctively column like structure of the particle coagulation areas. According to one of the features of the invention this is achieved in that by providing an inserted phase disc, an alternating sequence of zones with constructive and destructive interference occur. The phase disc is preferably arranged vertically to the longitudinal direction of the standing wave, whereby the phase disc comprises areas of varying thicknesses and that thicknesses $d_1$ and $d_2$ of the areas differ in a magnitude which causes a phase difference of the waves passing through the areas of approx. $\pi/4$ or an uneven multiple of $\pi/4$, whereby the smaller thickness $d_1$ is preferably one quarter or an even multiple of a quarter of the wavelength in the disc. The variation in thickness need not occur in a stepwise manner. The phase disc may either be embedded in the dispersion medium or may be arranged as a wall of the vessel acting as acoustic mirror or a be a part thereof.

In accordance with a further feature of the invention a distinctively column like structure of the particle coagulation areas is to be achieved by formation of gradients of the particle velocity amplitudes V within the areas of the nodes and antinodes. The formation is generated by a transducer, whereby the local amplitude characteristic of the gradients comprises relative minima and maxima in the lateral direction.

The invention may further provide that the electrically excitable and mechanically oscillating element is a piezoelectric resonator. This enables the application of sound to the dispersion medium without any difficulties. Particularly suitable are piezoceramics with a highly effective piezocoefficient, such as lead zirconate-titanate The most simple arrangement consists of using a disc-shaped piezoelectric resonator with plan-parallel disc surfaces (plan-parallel resonator). Typical thickness of the disc is between 1-3 mm, and the diameter of the disc is usually between 10 mm-10 cm. Rectangular discs are also common and are suitable for the invention. A better column-like concentration of the standing sound waves is to be achieved by using several, relatively small disc-like piezoelectric resonators, the resonators having both a plane and a convex disc surface (plan-convex resonator).

A particularly good formation of periodic particle velocity gradients in a lateral direction is achieved by operating the piezoelectric resonator at an anharmonic resonant frequency. Whereas in the case of a harmonic resonant frequency all points of the disc surface oscillate in phase, the displacement of individual particle areas occurs in opposite phase when applying anharmonic resonant frequency The term "anharmonic resonant frequency" is used here in accordance with the publication of S. HERTL, E. BENES, L. WIMMER, M. SCHMID, Proc. of the 39th Annual Frequency Control Symposium, pp. 535-543, Philadelphia, USA, 1985, "Investigation of quartz crystal thickness shear and twist modes using a new noninterferometric laser speckle measurement method".

Usually anharmonic oscillating modes consist of undesirable spurious resonances of the respective harmonic resonant frequencies (fundamental or upper wave). The electrical excitability of the anharmonic resonant frequency may be increased, in accordance to a further feature of the invention, by splitting the surfaces of the electrodes into partial areas, whereby the position and the size of such partial areas are chosen such-like that the areas conform to the position and size of the oscillating areas of the desired anharmonic oscillating modes and that the power supply for the electrodes belonging to areas oscillating in opposite phases is made in electrically opposite phases.

In order to allow for continuous operation, the vessel has, on the one hand, an opening which enables the dispersion medium to be treated to flow in and, on the other hand, an outlet through which the dispersion medium may flow out. The dispersion medium flows through the vessel essentially in a direction which is normal to the longitudinal direction, thus enabling the holding and coagulation of particles in the areas of the nodes and antinodes.

In the case of high concentrations of particles or low flow rates, it is preferable to periodically interrupt the electrical excitation of the resonance for such a period until the particles coagulated in the areas of the nodes and antinodes have been precipitated by means of gravity.

When encountering high flow speeds it is advantageous to also interrupt the flow for the time during which the electrical excitation has been stopped.

In order to realize the relative movement between the acoustic bottle and the vessel containing the dispersion medium it may be provided to slowly move the transducer in a lateral direction relating to the vessel. The acoustic coupling between the transducer and the vessel preferably takes place by means of a liquid film whose thickness is considerably less than one quarter of the wavelength in the liquid film at resonant frequency $f_n$. The liquid film for acoustically coupling the phase disc with a wall of the vessel serves simultaneously as a lubricant and consists, for example, of silicon oil of low viscosity or of water with a wetting agent. The thickness of liquid layer $d_F$ shall be kept as small as possible, in any case it should be a value which is considerably less than a quarter of the wavelength of the film material. The use of an applied resonant frequency of 2 MHz and water results in $d_F < < 0.19$ mm.

A further feature of the invention consists of the sharp tuning of the electrical excitation frequency of the transducer to a resonant frequency of the composite resonator This may either be a natural resonant frequency where the power consumption of the transducer has a relative maximum, a series-resonant frequency where, when power is supplied at a low impedance compared with that of resonator, power consumption of the transducer has a relative maximum, or a parallel-resonant frequency of the composite resonator where, in the case of power supply with an extremely high impedance, the voltage applied to the transducer has a relative maximum. It is preferable here to achieve sharp tuning to the relative maximum by automatic controlling of the electrical excitation frequency to the relative maximum. This is simply achieved by including the electric impedance arising on the electric contacts of the transducer as an amplitude- and phase-defining band pass filter element within the feedback circuit of an oscillator circuit. The oscillator circuit may also comprise a control unit for the amplitude of the voltage arising at the applied resonant frequency or for the power consumption coming about on the electric contacts of the transducer. In the first case, parallel resonance causes an amplitude of the particle velocity in the dispersion medium which is independently impressed by the dampening by the dispersion medium. In the second case the same is achieved by means of series resonance.

For the purpose of realizing the relative movement between the acoustic bottle and the vessel containing the dispersion medium in the longitudinal direction of sound it is provided that the vessel containing the dispersion medium comprises acoustically transparent walls (walls free from reflections) and that the vessel is displaced in a relative manner to the sound field, which is generated in a further vessel containing a coupling liquid For this purpose it is advantageous if the acoustically transparent walls have a wall thickness of half or an integral multiple of half a wavelength in the wall material at applied frequency $f_n$. When plexiglass is used as wall material, a wall thickness of 2.7 mm ensues at $f_n = 2$ MHz for $4\lambda/2$. A certain amount of distorting reflections may also occur when a material is used for the acoustically transparent walls whose characteristic acoustic impedance $z_W$ distinguishes itself as little as possible from characteristic acoustic impedance $z_D$ of the dispersion medium. For example, this is fulfilled when water is used as dispersion medium and wall materials consist of teflon and polyethylene.

For the purpose of achieving an extensive separation of particles and dispersion medium, i.e., for achieving a particle-free area which extends over as many wavelengths as possible, it is provided in accordance with a particularly important feature of the invention that the composite resonator is divided in its longitudinal direction into one or several separation areas and into one or several waveguide areas, and that, by means of an electronic circuit, the drive frequency of the composite resonator is increased, by starting out from a minimal resonant frequency $f_{min}$, in a stepwise manner from one resonant frequency $f_n$ via the respective next resonant frequency $f_{n+1}$ until, finally, the maximum resonant frequency $f_{max}$ has been reached, and that within a delay time $t_T$, which is very small compared to the reaction period $\Delta t_n$ of the respective frequency $f_n$, it is reverted back to initial frequency $f_{min}$, and that furthermore said process is repeated in a cyclic manner and the position and the length $d_s$ of each separation area is chosen within the total length L of the composite resonator such like that for any step in frequency of $f_n \rightarrow f_{n+1}$, the greatest displacement of a sound antinode area to occur within a separation area is always less than a quarter, but preferably one sixth, of the respective initial wavelength $\lambda_n$, and that the greatest possible displacement $\Delta$ of a sound antinode area to occur within a separation area, said displacement belonging to the total frequency deviation $f_{max} - f_{min}$, is greater than one quarter of the mean wavelength $\lambda max/4$. The same applies to the stepwise decrease in the excitation frequency.

The arrangement of two separation areas being preferably arranged symmetrically to the axis of symmetry and three areas of waveguides enables good exploitation of the volume to be used for the separation effect, whereby one of the waveguide areas is placed in the midst of two separation areas and the remaining two waveguide areas are arranged at the ends of the composite resonator.

Higher quality ooefficients (reciprocal values of dampening) are to be achieved for the composite resonator, if the transducer is either contained in the central waveguide area or forms the area.

In order to reach the necessary acoustical length of the central waveguide and, simultaneously, high total quality, the waveguide area is preferably realized by a liquid area consisting of the dispersion medium, whereby the liquid area is occluded by acoustically transparent walls.

For the same reason the waveguide areas arranged at the ends are each formed by a liquid area preferably consisting of the dispersion medium, the area being occluded at its interior end by an acoustically transparent wall and at its exterior end by an acoustical mirror.

The acoustically transparent (reflection-free) walls are realized by means of discs with a wall thickness of half or, if it is necesssary to avoid bowing of the plate, an integral multiple of half a wavelength $\lambda G/2$ in the wall material at a median applied frequency of fm.

The desired freedom from reflections is to be maintained over a greater frequency area in the case that acoustically transparent walls are made from a material whose characteristic acoustic impedance $z_W$ is to be distinguished as little as possible from the characteristic acoustic impedance $z_D$ of the dispersion medium.

In order to keep costs down and for reasons of sturdiness it is important in large plants to be able to produce the acoustically transparent walls from an interior wall material (e.g. stainless steel) of arbitrary sizes. This is achieved in that the characteristic acoustic impedance $z_W$ of the wall material is tuned, on the side facing the dispersion medium, to the characteristic acoustic impedance $z_D$ of the dispersion via a directly adjoining $\lambda/4$-transformation layer, whereas, on the side facing the coupling liquid, this is achieved by means of a directly adjoining $\lambda/4$-transformation layer which tunes the impedance to characteristic acoustic impedance $z_K$ of the coupling liquid (see also equation [6]).

Particularly good results were obtained with dimensions where the acoustic length $d_{Wa}$ of the median waveguide area was approximately equal to one third of the acoustic length of the composite resonator.

In the case of rising excitation frequencies the waveguide areas located at the ends can consist, in the most simplest of cases, of the vessels walls themselves which are arranged as acoustic mirrors (minuscle length $d_{Wa}$ of the outer waveguides). Thus the dispersion medium is separated with a high cleaning rate, whereas the concentration of the particles in the enriched dispersion is only very low. If high concentration is to be achieved, it is necessary to choose longer outer waveguide areas (e.g., equal to the separation area or equal to one sixth of the overall length of the resonator).

In the case of a decreasing excitation frequency, the median waveguide can only be arranged, in the most simplest of cases, by the transducer itself.

For the purpose of achieving an overall high quality of the resonator, it is important to select initial resonant frequency $f_{min}$ lower than resonant frequency $f_K$ of the transducer and the maximum resonant frequency $f_{max}$ greater than said frequency $f_K$. Here resonant frequency $f_K$ of the transducer is to be a resonant frequency (mostly fundamental wave excitation or third upper harmonic wave) in air or vacuum as the surrounding medium. Typical values for $f_K$ are around 2 MHz, whereby the median resonant frequency is advantageously chosen equal to this value. The size of a frequency step (distance between two adjoining resonant frequencies of the composite resonator $(f_n - f_{n+1})$) is typically 7 kHz. This frequency step naturally does not remain constant, but slightly changes in accordance with geometric progression:

$$\frac{f_{n+1}}{f_n} = \frac{n+1}{1} \qquad [5]$$

The realization of a so called PLL (Phase Locked LOOp) circuit is thus particularly simple.

It is hereby pointed out that the lengths mentioned herein are to be understood, in accordance with the invention, as the relevant acoustic lengths (multiples of half wavelengths in the respective media).

For the operation in flowing media on a commercial scale, it is provided that the dispersion medium flows through the separation areas mainly normal to the direction of wave propagation. It is important here to chose the speed of flow such-like that the resting period of the dispersion medium in the separation area which is subjected to applied sound is greater than the period of temporal progression of drive frequency f.

A continuous displacement of the areas of the antinodes and, consequently, an even higher speed of separation is achieved by a further variation of the inventive arrangement in that the composite resonator is arranged as ring resonator having at least one transducer. In this ring resonator the acoustic wave is reflected in itself in a ring-like manner by means of a mirror system just like in ringlasers. Just like in standing waves a resonance step-up of the particle velocity amplitude occurs in the circulating wave for frequencies whose total acoustic path length along the circumference of the ring consists of an integral multiple of half of the wavelength. The mirror system is preferably arranged in such a manner so that the individual mirror surfaces fulfill the conditions for total reflection of the respective impinging wave, i.e. that the threshold angle for total reflection of longitudinal and shear waves, according to equation [3], is smaller than the angle of the impinging wave. This is to be achieved by selecting a reflector material with suitable speed of sound. The circulation speed of the wave is equal to the speed of sound. Through this resonant ring wave uniform forces act on the dispersed particles in the direction of circulation of the ring wave, which are, however, only very small. The ring resonator is preferably arranged in such a manner that both a first resonant ring wave of frequency $f_1$ is generated, as well as in the opposite direction a second resonant ring wave of frequency $f_2$, whereby the frequencies differ slightly. Thus a slowly circulating "standing" wave is generated, whereby the rotational speed showing in the direction of the wave with the higher frequency is considerably lower than the speed of sound. Typical optimal rotational speeds are within the magnitude of one circulation per several seconds. The use of unidirectional transducers is essential. Normal transducers, which—without any other measures—simultaneously send sound waves of an opposite orientation, only produce standing waves in the narrower sense in a ring resonator arrangement, whereby no movement whatsoever takes place in the resonant wave field. The difference frequency $\Delta f = f_1 - f_2$ is typically selected within the area of 1 to 100 Hz.

In a preferable arrangement the ring resonator comprises two unidirectional transducers which emit two sound waves of slightly varying frequencies in opposite directions. The unidirectional transducer may consist of a piezoelectric sandwich resonator core having a random overall thickness d and consisting of piezoelectric discs, the thickness d/N of which being preferably the same, the thickness being in the magnitude of the $n^{th}$ part of the total thickness d, whereby N consists of the total number of discs and the discs each comprise electrodes on both sides which are excited by means of periodic voltages $u_i$ and whose temporal phase shifts $\phi_i$ are equal to the respective local phase shifts $\phi_i$ of sound particle velocity $V_i$ in the $i^{th}$ disc of the acoustic wave generated by the transducer.

$$u_i U \sin(\omega t - \phi_i), \quad V_i = V\sin(x/\lambda_A - \Omega_i), \quad \phi_i = \Omega_i \pi N.$$
$$\lambda_A = c_A f_n, \qquad [6]$$

whereby $c_A$ and $\lambda_A$ are the speed of sound or the wavelength in the piezoelectric discs respectively. The drive voltages for the discs of the resonator core are temporally Phase-shifted in such a manner that an acoustic wave is only generated in one direction, but not in the opposite direction.

If, on the one hand, the characteristic acoustic impedances of the piezoelectric discs and, on the other hand, the dispersion medium or coupling liquid respectively differ strongly, a superimposition of the standing waves in the narrower sense with the desired slowly circulating "standing waves" occurs due to the reflections caused thereby, whereby such superimposition distorts the separation effect. In order to avoid such a negative effect, $\lambda/4$ transformation layers are preferably to be placed adjacent to the sandwich resonator core, said layers tuning the characteristic acoustic impedance $z_A$ of the disc material either to the characteristic acoustic impedance $z_D$ of the dispersion or to the characteristic acoustic impedance $z_K$ of the coupling liquid.

$$z_B = \sqrt{z_A z_D}, \quad z_C = \sqrt{z_A z_K}. \qquad [7]$$

The unidirectional transducer preferably consists of a piezoelectric resonator core having a total thickness d, said thickness being equal to half of the wavelength $\lambda A/2$ or equal to an integral multiple of half of the wavelength $k\lambda/2A$ of the sound wave emitted by the unidirectional transducer. Thus one of the two transformation layers can be dropped. The remaining layer only has to tune characteristic acoustic impedance $z_D$ of the dispersion medium to the characteristic acoustic impedance $z_K$ of the coupling liquid. The characteristic acoustic impedance $z_T$ results from $$z_T = \sqrt{z_D z_K}. \qquad [8]$$

A further simplification is to be achieved if the dispersion medium is used as the coupling liquid. In this case no transformation layer is required.

In accordance with a last feature of the invention, the two unidirectional transducers, which emit two sound waves of slightly varying frequencies in opposite directions, may be replaced by a single transducer which, by respective geometrical arrangement and electrical excitation, also generates a slowly circulating "standing" wave, whereby, However, the transducer nevertheless remains stationary in a resonant condition. The transducer consists of at least two piezoelectric discs having thicknesses $D_1$ and $D_2$, which are equal to half the wavelength $\lambda_A/2$ or equal to an integral multiple of half of the wavelength $K\lambda_A/2$ of the sound waves emitted by said transducer. Preferably, the discs comprise the same thickness and are located at a distance D from each other, said distance being filled with a filling material preferably being the dispersion medium and being equal to a quarter or an uneven multiple of a quarter of the wavelength $K\lambda_F/4$ in the filling material. In this specific transducer the two piezoelectric discs comprise electrodes on both sides which are excited by alternating voltage $U_1$ and $U_2$, and comprise periodic amplitude modulations and have a temporal phase shift $\phi$ with regard to each other, the phase shift being equal to $\pi/2$ or an uneven multiple of $\pi/2(k\pi/2)$. It applies that $$u_1 = U \sin\Omega t . \sin\omega t.$$
$$u_2 = U \sin(\Omega t - \Phi).\sin\omega t = U\cos\Omega t.\sin\omega t, \quad \Phi = k\pi/2, \qquad [9]$$

whereby $U\sin\Omega t$ or $U\sin(\Omega t-)$ refer to the time controlled amplitudes of voltages $U_1$ and $U_2$, U refers to the maximum amplitude value of the voltages, $\Omega = 2\pi F$ refers to the radian frequency of the amplitude modulation and $\Omega = 2\pi f$ is the radian frequency of the exciting, high frequency alternating voltage. Typical values for $\omega$ and $\Omega$ are here $2\pi.2$MHz or $2\pi.100$Hz. This transducer, which is capable of producing a circulating "standing" wave when suitably electrically excited, may also be used, in accordance with a further arrangement of the invention, as a unidirectional transducer for producing a moving standing wave by performing electrical excitation without amplitude modulation, thus replacing the electrical drive voltages in accordance with equation [9] by formula [10]

$$u_1 = U\sin\omega t, \quad u_2 = U\cos\omega t$$

The advantage of this transducer lies in the fact that depending on the respective electrical excitation it is to be used both as unidirectional transducer for generation of a moving standing wave and as general transducer for generating a circulating "standing" wave. The advantages of the inventive method are outlined based on two technically important examples.

In EXAMPLE 1 the dispersion to be treated consisted of a solid dispersion dye which was suspended in water. The grain size of the majority (85%) of the particles was between 0.2 and 2.5 $\mu$m, the density ratio dye/water was $\rho'/\rho = 2.95$, the characteristic frequency was approx. $f_o = 1, 9$ MHz, the applied resonant frequency of the composite resonator was selected from the large number of resonant frequencies available and consisted of $f_{res} = f_n = 2.35$ MHz, and the maximum amplitude of the sound particle velocity was $V_{max} = 3$ m/s. The sound was applied for $t = 2$ min and the turbidity (before applying sound $T_{bef} = 100\%$) was $T_{aft} = 95\%$ after applying sound in a conventional manner ($V > V_{max}$ and $f \neq f_{res}$, or $V \leq V_{max}$ and $f \neq f_{res}$, or $V > V_{max}$ and $f = f_{res}$, or $V << V_{max}$ and $f \neq f_{res}$, or $V << V_{max}$ and $f = f_{res}$) $T_{aft} = 95\%$, whereas after applying sound in accordance to the invention $T_{aft} = 15\%$.

In EXAMPLE 2 the dispersion to be treated consisted of a dust from mineral matter which was suspended in water. The grain size of the majority (90%) of the particles was between 1 and 5 μm, the density ratio was $\rho'/\rho = 3.2$, the characteristic frequency was approx. $f_0 0.47$ MHz, the applied resonant frequency was chosen from the large number of resonant frequencies available and consisted of $f_{res} = f_n = 2.35$ MHz and the maximum amplitude Of the particle sound velocity was $V_{max} = 7$ m/s. The sound was applied for $t = 2$ min and the turbidity (before applying sound $T_{bef} = 100\%$) was $T_{aft} = 96\%$ after applying sound in a conventional manner, whereas, however, after applying sound in accordance with the invention $T_{aft} = 10\%$.

When moving the standing sound field in a lateral direction to the standing wave, the periods of sound application necessary for achieving separation can be typically reduced to 1/10th of the values for stationary operation. If, however, the sound field is moved in a longitudinal direction, reductions in time even exceeding above value are to be achieved or, when keeping the same period of applied sound, significantly less turbidity remains. Suitable moving speeds in the lateral direction of the wave are within a magnitude of 1 cm/s, in a longitudinal direction 10 cm/s.

SHORT DESCRIPTION OF THE FIGURES

The figures show:

FIGS. 1 to 3 schematically show various arrangements of the inventive apparatus.

FIGS. 13a and 13b provide a principal display of the inventive apparatus at various points of time, or the frequency response in dependence of the time respectively.

Figure 14:
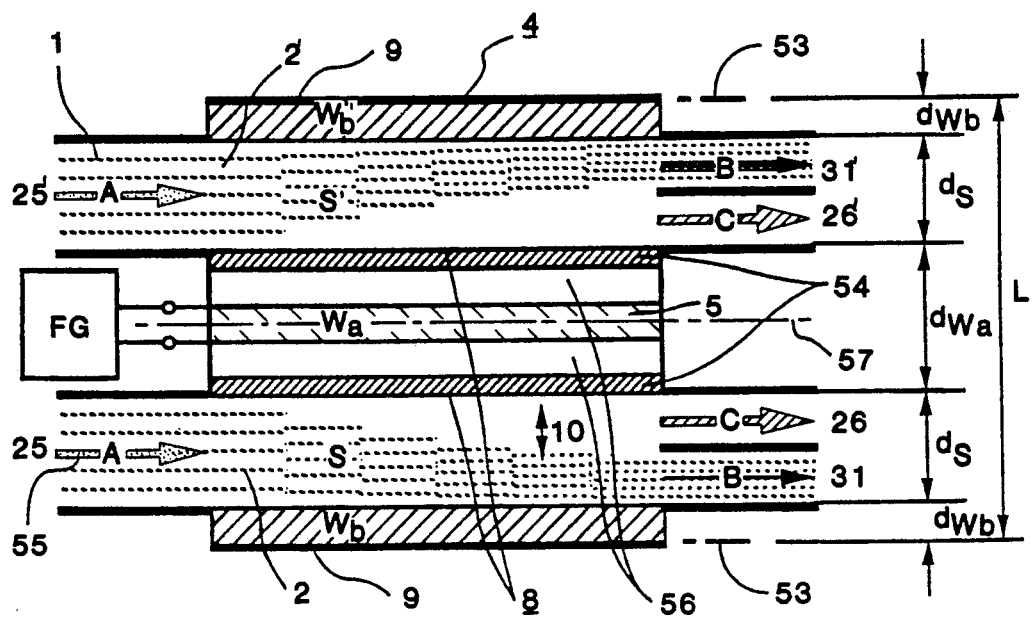
Figure 15:
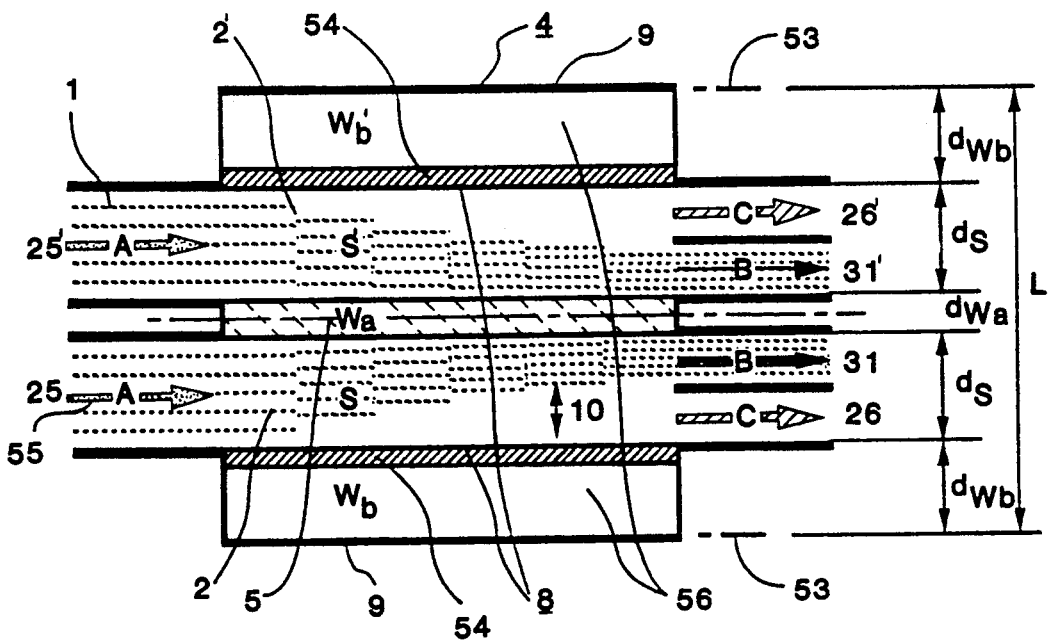

FIGS. 14 and 15 are further arrangements of the inventive apparatus.

Figure 16:
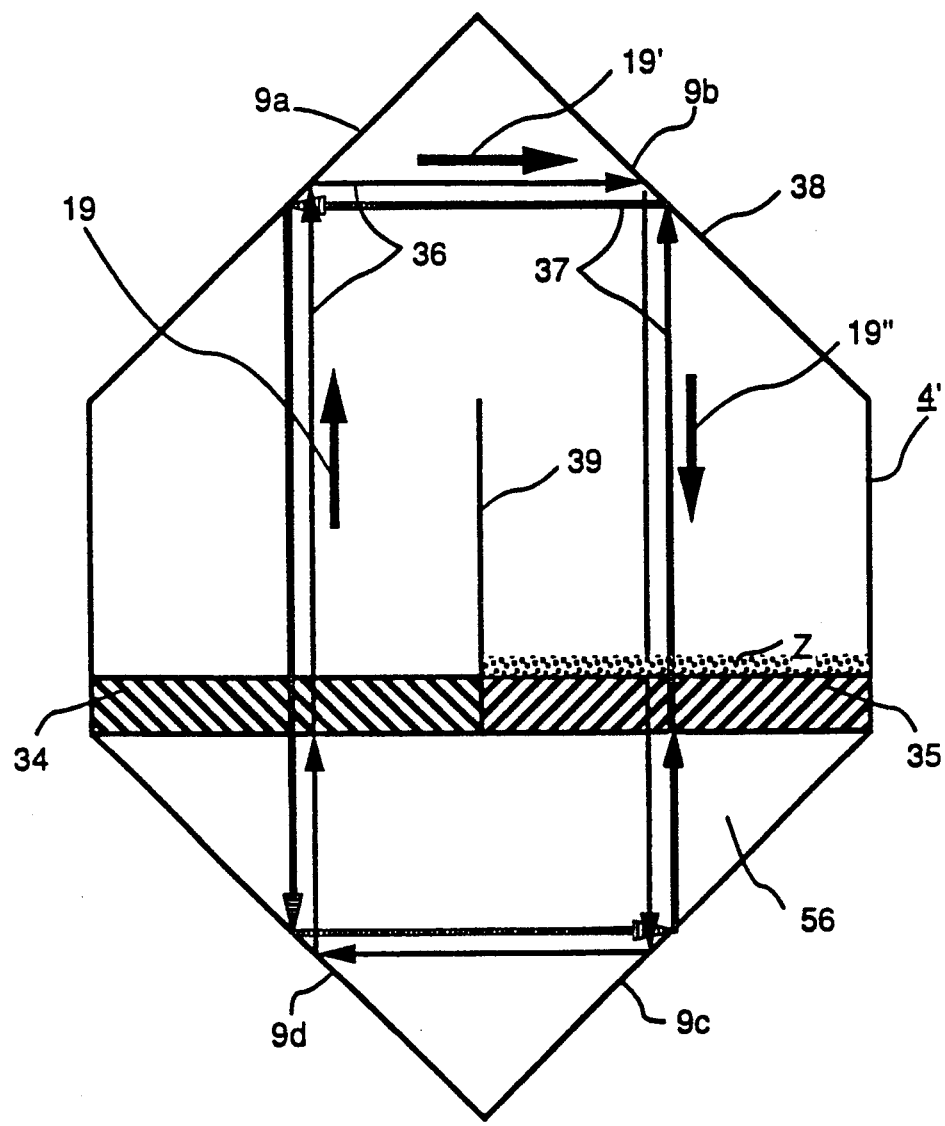

FIG. 16 shows an arrangement of the composite resonator in a section.

Figure 17:
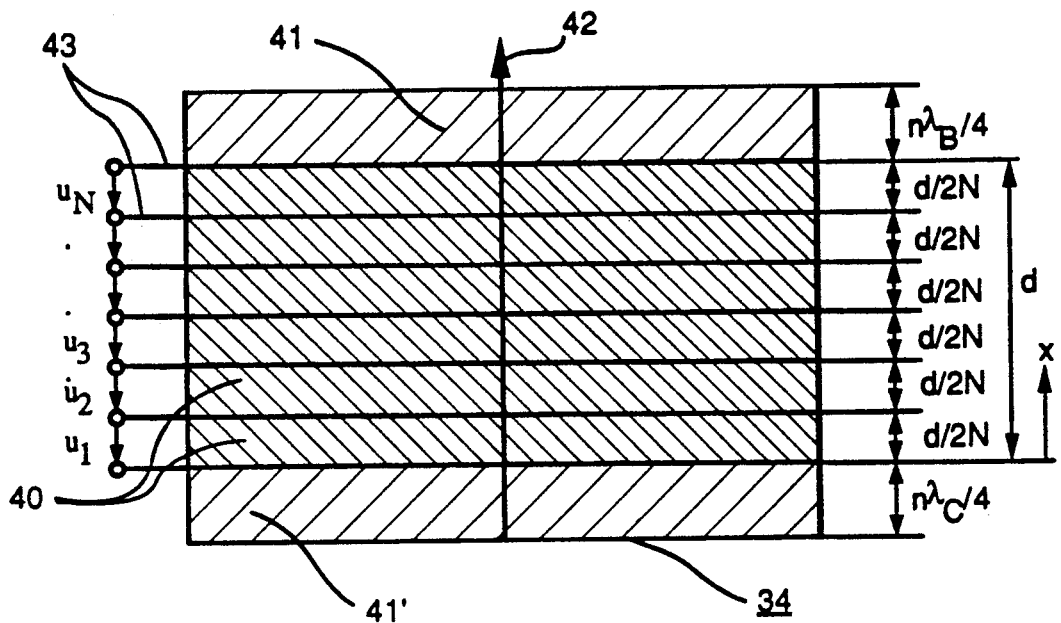

FIG. 17 shows an arrangement of a unidirectional transducer.

Figure 18:
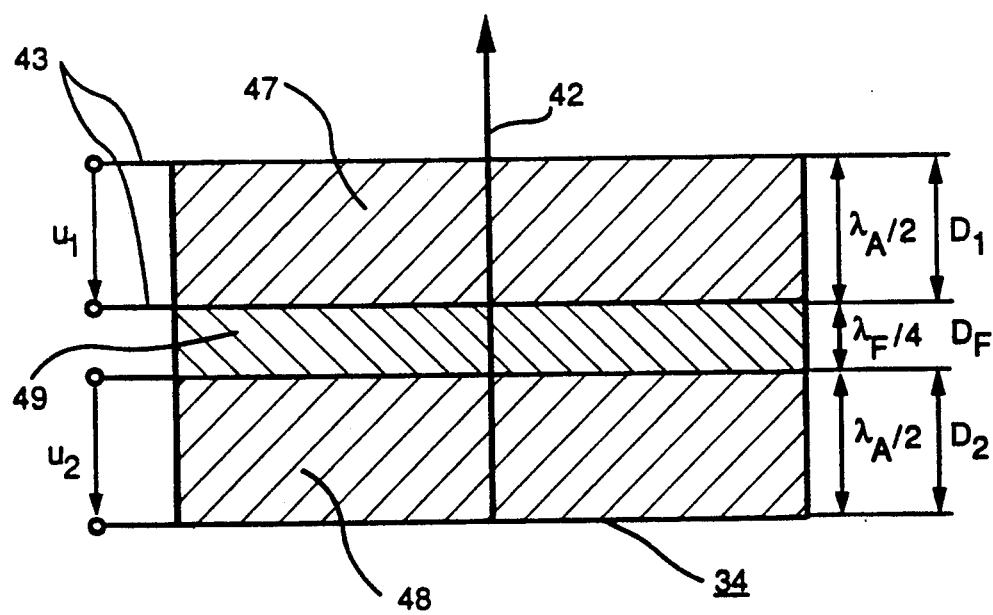

FIG. 18 shows an arrangement of a transducer which generates a slowly moving "standing" wave.

DETAILED DESCRIPTION OF THE PREFERRED ARRANGEMENTS OF THE INVENTION

Figure 1:
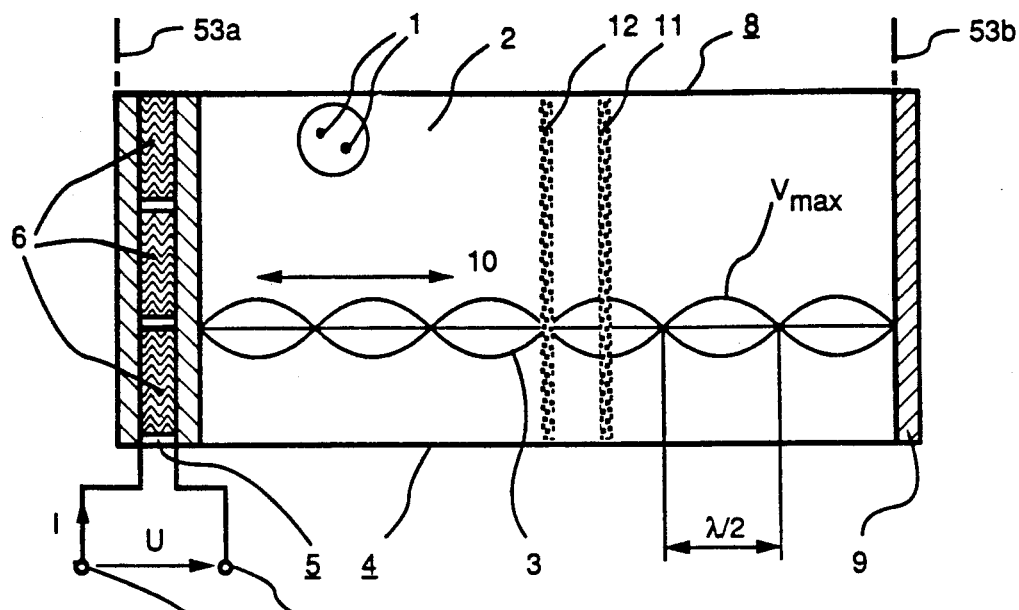

As is schematically displayed in FIG. 1, a vessel 8 is arranged containing dispersion 2. Like in ultrasonic cleaning, the application of sound takes place by using a composite resonator 4 having a transducer 5 which consists of an electrically driven and mechanically oscillating element 6, or of several such elements, and which is acoustically coupled to the vessel 8 on the side facing vessel 8 containing dispersion 2 and which guarantees, on the side facing the air, total reflection of the acoustic wave by means of an effective reflection area 53a. The effective reflection areas 53a and 53b are thus the boundary layers across which the sound waves cannot extend any further and on which the total reflection of the sound wave occurs. They are further characterized in that the sound wave is caught between them and that consequently a standing wave 3 is formed. The distance between the two effective reflection areas is equal to the effective length of the resonator, which is decisive for determining the resonant frequency. A large number of N half wavelengths and, in the case that an inventive mirror 9 is used only at one of the two resonator ends, quarter wavelengths can be attributed to the effective resonator length. The electrically driven and mechanically oscillating element 6 mostly consists of piezoceramic discs or rings which, for example, are made from barium titanate or lead zirconate-titanate. Depending on the desired electric impedance between contacts 14 of transducer 5, the pairs of electrodes of the piezoelements may be combined, by means of parallel or series connection or a combination of both, to two contacts 14 to which drive voltage U is applied and through which drive current I flows. As the invention is, in its most important features, not dependent on the type of excitation, also electromagnetic drives, such as loudspeakers, or magnetostrictive elements may be used.

The sound waves have to be reflected by a second effective reflection area 53b of an acoustic mirror 9, which in this arrangement also constitutes a limiting wall, in order to form standing sound waves 3 which generate sound radiation forces on particles 1 in the longitudinal direction 10 of the standing waves 3. The sound radiation forces drive particles 1 into the areas of antinodes 11, where the maximum amplitudes $V_{max}$ of the sound particle velocity come about, or areas of nodes 12 of the standing sound wave, and hold them there (longitudinal holding forces). The adjoining parallel areas of antinodes, which are plane in this example, are located at a distance of half a wavelength $\lambda/2$ from each other. The same applies to areas of nodes 12. Limiting walls 9 for the sound field coincide with limiting walls 9 of vessel 8 containing dispersion 2.

Figure 2:
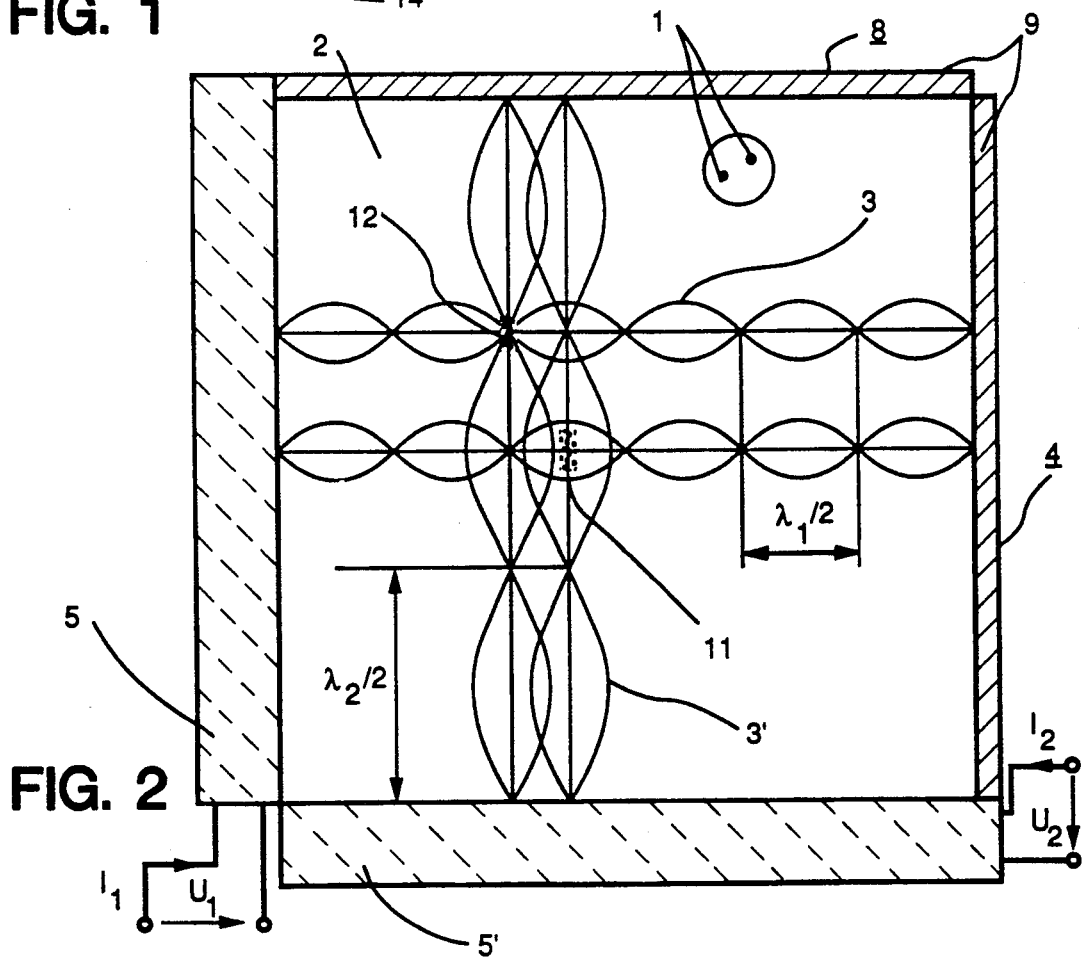

FIG. 2 shows an arrangement in which two standing fields of waves 3 and 3' are generated by two transducers 5 and 5', whereby the transducers form a right angle. The two mirrors 9 also form an angle of 90° here. The drive voltages $U_1$ and $U_2$ are applied to the electric contacts of transducers 5 and 5' and cause currents $I_1$ and $I_2$, and excite composite resonator 8 simultaneously at two, generally different, resonant frequencies to which the different wavelengths $\lambda_1$ and $\lambda_2$ belong In such a manner a wider range of particle sizes is optimally covered and higher particle concentration in the areas of nodes and antinodes is achieved. The areas of antinodes 11 and the areas of nodes 12 of the sound field are not plane formations as is described in the arrangement according to FIG. 1, but more or less shaped in the form of a line. Depending on the quality of particles 1, i.e., in particular depending on the sign of the acoustic response factor, the particles 1 assemble in the areas of antinodes or in the areas of nodes 12.

Figure 3:
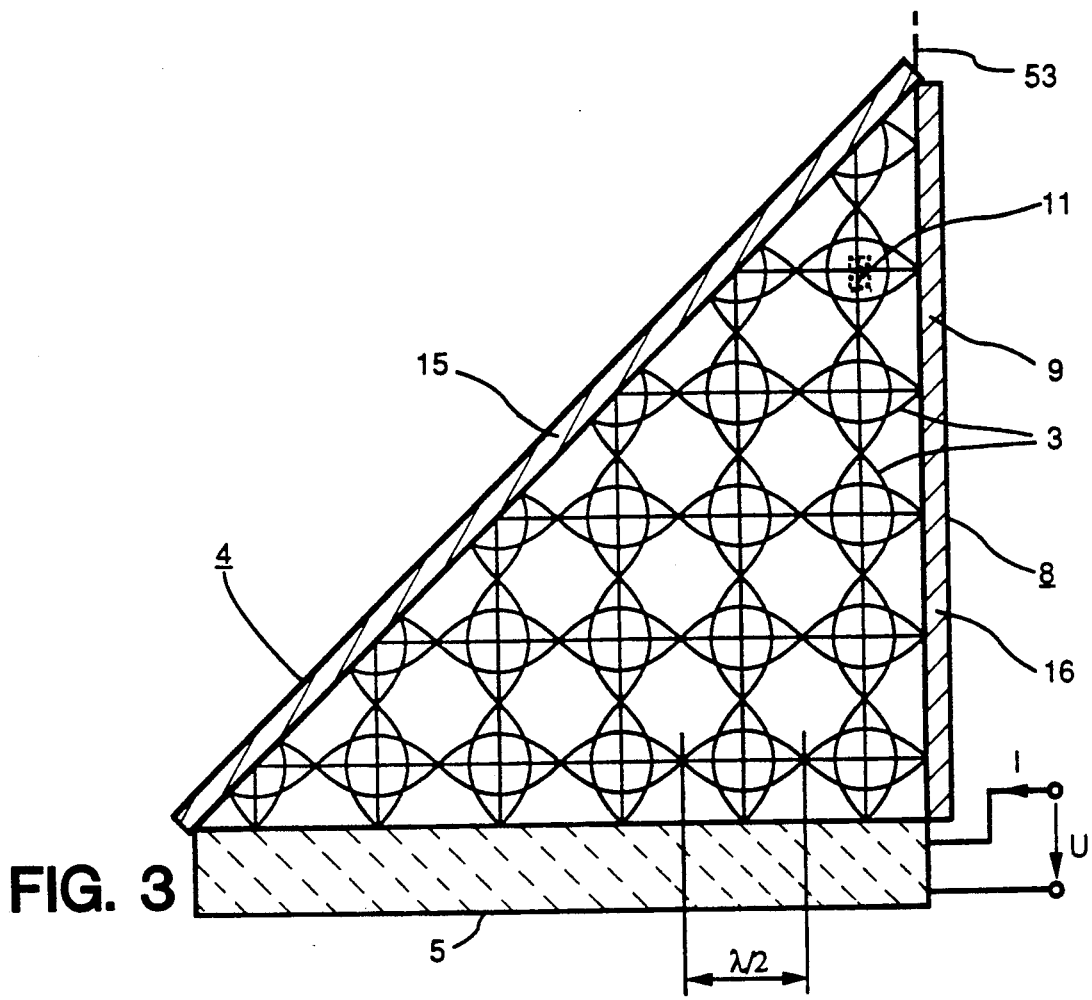

In the inventive arrangement of FIG. 3 outlined schematically in a section, the superimposition of wave fronts forming a right angle is achieved by means of a single transducer 5. Transducer 5 forms an isosceles right-angled triangle with the mirror system consisting of a mirror 15 slanted by 45° and a further mirror 9 being normal to standing wave 3 and comprising effective reflection area 53, whereby mirror 15 forms the hypotenuse. This allows dropping one transducer. Areas of antinodes are also line-shaped, whereby the lines with high concentrations of particles are normal to the plane of projection.

Figure 4:
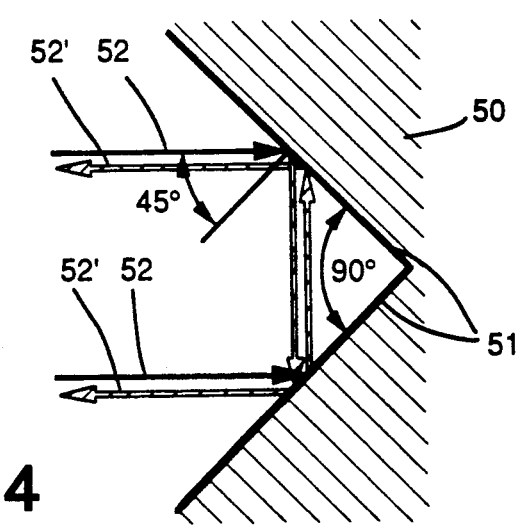
FIG. 4 shows the principle and FIG. 5 an arrangement of the reflector unit.
Figure 5:
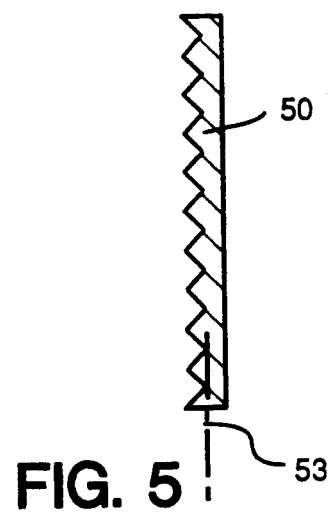

FIG. 4 shows the principal function and FIG. 5 an arrangement of the inventive reflectors 50 which guarantee firstly a total reflection of the impinging sound wave 52 without any losses in the reflector and, secondly, phase coincidence of impinging wave 52 and reflected wave 52'. The individual mirror surfaces form an angle of 90°. This measure ensures the respective impingement of the acoustic radiation on the surface of the respective reflector area at 45° and consequently total reflection and phase coincidence of all sound waves. In this arrangement the effective reflection area 53 is defined in that it includes all points of intersection of the individual mirror surfaces 51.

Figure 6:
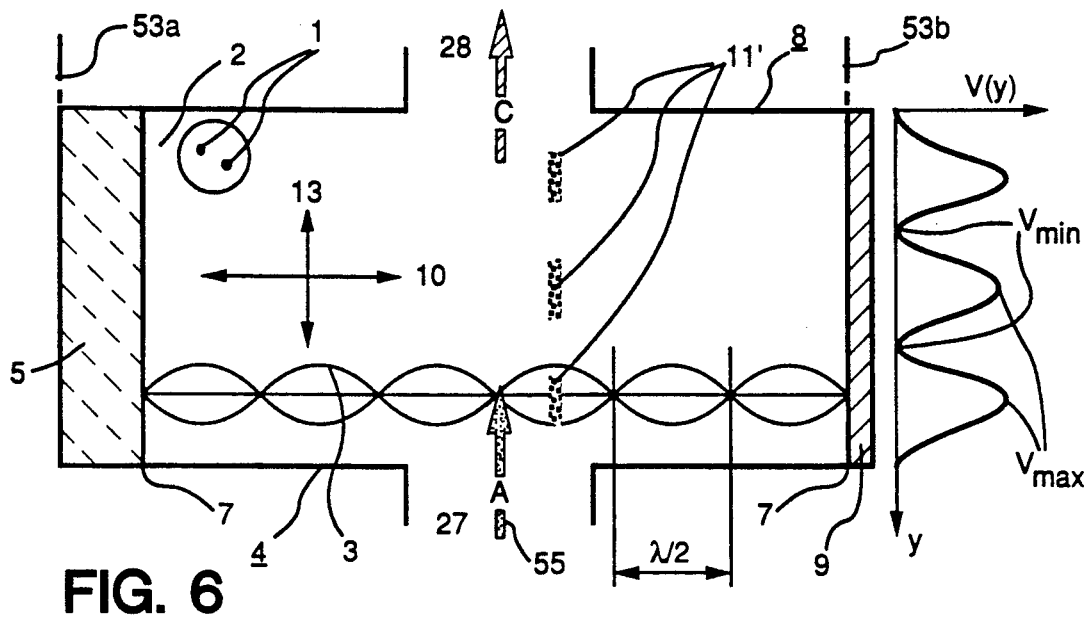
FIG. 6 shows an arrangement of the inventive apparatus with flow of the liquid and distribution of amplitudes in a lateral direction.

FIG. 6 schematically shows a further option to locally increase the concentration of particles 1 in dispersion 2. The particle velocity amplitude V(y) of waves 3 varies along direction y between a minimum value $V_{min}$ and a maximum value $V_{max}$, whereby the direction y is at a right angle 13 to the direction of propagation of the waves. In such a manner lateral forces become effective on the particles, said forces arising due to the gradients of the particle velocity amplitude V within the areas of antinodes and areas of nodes 12 respectively. Particles concentrate therefore only in the areas 11' with a large amplitude V. Transducer 5 is acoustically coupled with vessel 8 by means of a coupling film 7 which consists of, in the simplest case, of a very thin liquid or adhesive film. Dispersion A to be treated flows into vessel 8 via inlet 27 and cleaned dispersion medium C leaves via outlet 28, thus causing the direction of the flow 55 to be kept more or less normal to the longitudinal direction 10. Dispersed particles 1 are held and concentrated in the areas with maximum amplitude 11'.

Figure 7:
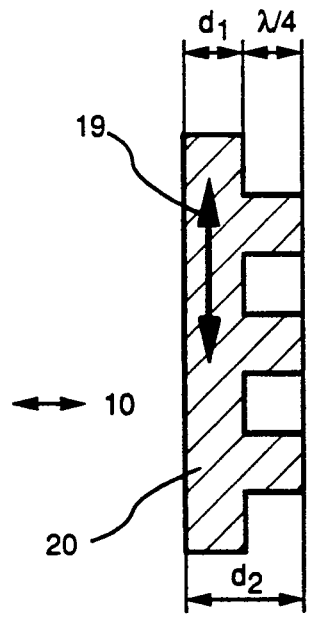
FIG. 7 shows an arrangement of a phase disc.

FIG. 7 displays a phase disc 20 having areas with varying thickness $d_1$ and $d_2$. These areas are separated from each other by right-angled junctions. The difference in thickness is preferably chosen one quarter or an uneven multiple of a quarter of the wavelength λ in the phase disc. The smaller thickness $d_1$ is preferably chosen equal to an integral multiple of a quarter of the wavelength λ. The phase disc is preferably moved in direction 19 normal to the longitudinal direction 10 of the waves.

Figure 8:
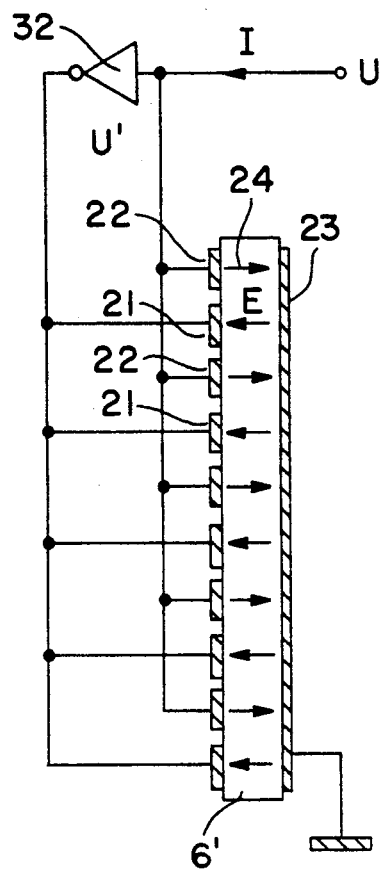
FIGS. 8-10 show arrangements of the electrodes for anharmonic excitation of piezoelectric resonators.
Figure 9:
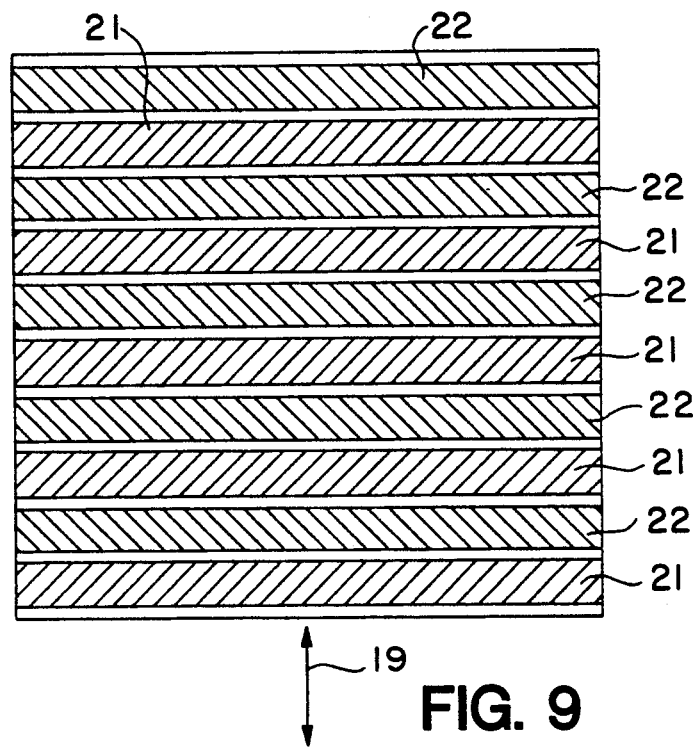

In FIGS. 8 and 9 the electrode for exciting the oscillating elements 6' are separated into two different sets of electrodes 21 and 22. Set of electrodes 22 is fed by means of feed voltage U. The other set of electrodes 21 is fed by means of feed voltage U', said voltage having been gained by inverting U. For this purpose an inverting amplifier 32 is connected in series thereto. Because of the difference in potential to the grounded counter-electrode 23, in areas with a varying direction 24 of the electric field strength E comes about at a certain time in piezoelectric resonator 6'.

Figure 10:
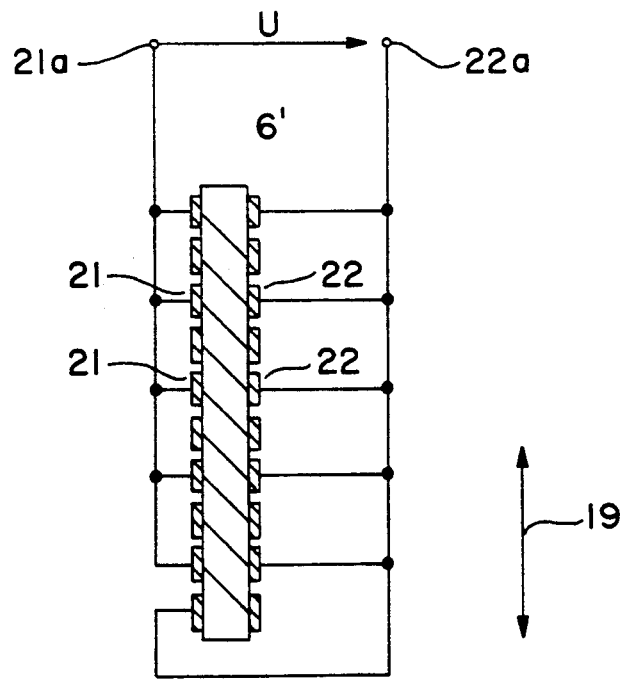

In the arrangement for applying sound outlined in FIG. 10, a set of electrodes 21 is connected to pole 21a of control voltage U, and set of electrodes 22 is connected to the other pole 22a. Therein one electrode section of set of electrodes 21 is situated directly opposite of an electrode section of electrodes 22. This measure brings about that in comparison to the arrangements in accordance to FIGS. 9 and 10 there is a smaller amount of distorting lateral components of the electric field.

Figure 11:
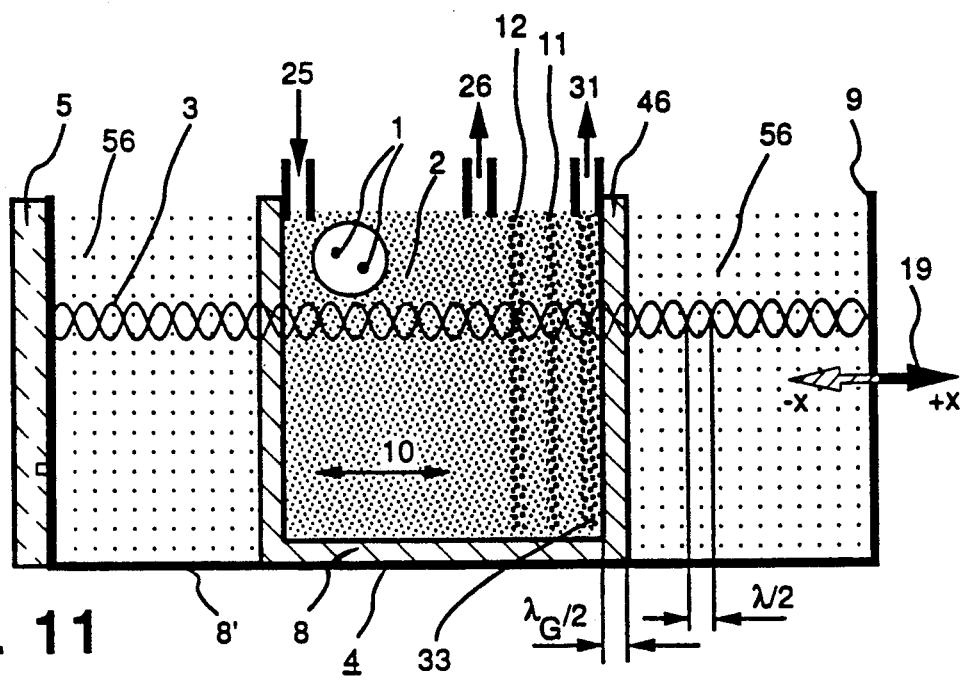
FIG. 11 shows a further arrangement of the inventive apparatus in a section according to line XI—XI in FIG. 12, where the vessel containing the dispersion is moved mechanically and relating to the sound field in a longitudinal direction.
Figure 12:
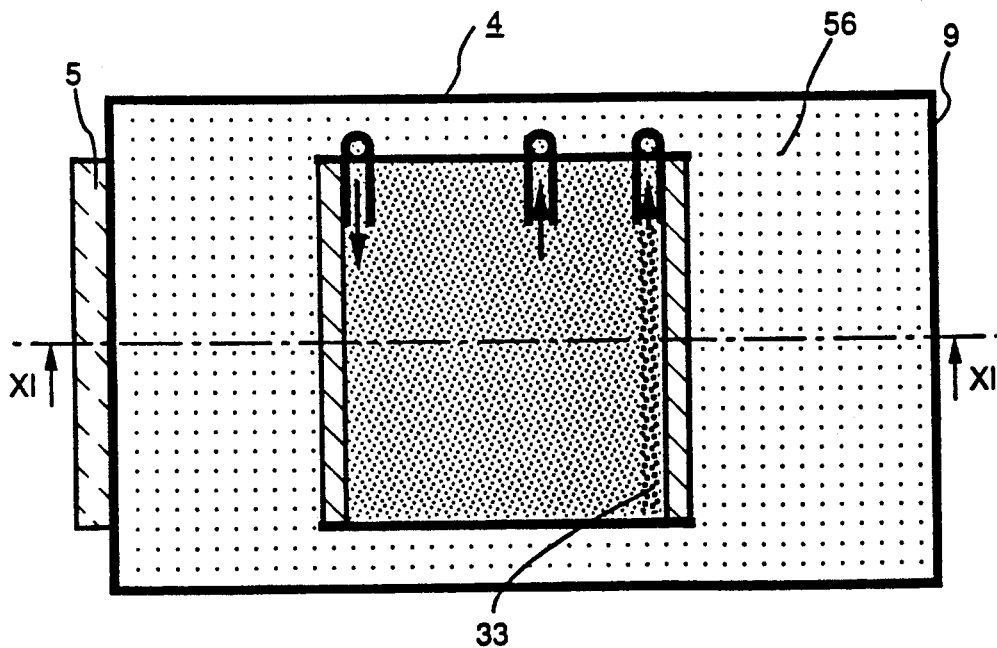

In accordance with an arrangement of the inventive apparatus following FIGS. 11 and 12, interior vessel 8 containing dispersion 2 is displaced relating to the sound field in a direction 19 being parallel to the longitudinal direction 10 of the sound field, whereby the sound field is generated in an exterior vessel 8'. Interior vessel 8 consists of sound-permeable, reflection-free walls 46 and is located in main vessel 8'. The space between interior vessel 8 and main vessel 8' is filled with a coupling liquid 56 which usually consists of the dispersion medium, e.g. water. A standing wave 3 is static with regard to vessel 8'. If vessel 8' is slowly moved in the direction +x (separating phase), particles 1, which—depending on the sign of the acoustic response factor —are held in the planes of antinodes 11 or planes of nodes 12, are concentrated in the rim zone 33 of interior vessel 8 where they are drawn off via suction outlet 31. Walls 46 of interior vessel 8 are free from reflections. In this specific arrangement this is achieved by a wall thickness which is equal to half the wavelength $\lambda_G/2$ in the wall material. Thus vessel 8 containing the dispersion is virtually acoustically invisible.

In the arrangement of the invention according to FIG. 13, a standing wave 3 is generated between the effective reflection areas 53 of a transducer 5 and an acoustic mirror 9. The composite resonator comprises, on the one hand, a separation area S having a thickness $d_s$, the area being flowed through normal to the direction of propagation of standing wave 3 and in which the dispersed particles assemble in the areas of antinodes 11, and, on the other hand, two waveguide areas $W_a$ and $W_b$ with thicknesses $d_{wa}$ and $d_{wb}$ which are filled with the dispersion medium. Separation area S is separated from the waveguide areas $W_a$ and $W_b$ by two acoustically transparent walls 54 having a thickness $d_T$of λ/2. Diagram of FIG. 13b shows the time sequence of the changes in frequency and in FIG. 13a the respective conditions the resonator for the time of two periods $t_o \rightarrow t_5'$. For a period T the frequency is increased in a stepwise manner from resonant frequency $f_1$ to the next resonant frequency $f_{n+1}$ (n=1 to n=4), whereby the sequence $f_1$ to $f_5$ constitutes a geometric progression. The initial frequency $f_1=f_{min}$ and the final frequency $f_5=f_{max}$ are chosen such-like that the median frequency fm is approx. $(f_{min}+f_{max})/2$ in the neighborhood of resonant frequency $f_K$ of the transducer. During the subsequent resting time, which is very small in comparison with the reaction period $\Delta t_n=t_n-t_{n-1}$, one switches back to the initial frequency $f_{min}$ and the next period starts. The number N of the half wavelengths λn/2 in the resonator increases here in each step by the value of one (N→N+1). Only in the last step of the period—when switching back to the initial frequency $f_{min}$ —does N revert back to its initial value. It applies that $n=N-N_{min}$, whereby $N_{min}$ is equivalent to the number of half wavelengths which comes about at frequency $f_{min}$ in resonator 4 between the effective mirror areas 53. The position and the length of separation area S is chosen such-like that the greatest displacement of an area of antinode 11 when passing from $f_n$ to the respective next resonant frequency $f_{n+1}$ is o equivalent to one eighth of the wavelength $\lambda_n$ belonging to $f_n$, and that the maximum displacement of the area of antinode 11 is approx. $\lambda_1/2$ during one period. The area cleaned at the end of two periods thus comprises a thickness of 2 Δ.

In the arrangements in accordance with FIGS. 14 and 15, the composite resonator of overall length L (typically 20 to 30 cm) consists of two separation areas S and S' and of three waveguide areas $W_a$, $W_b$ and $W_b'$, of which waveguide area $W_a$, which is arranged in the center of the resonator arrangement being symmetrically arranged with regard to axis of symmetry 57, comprises transducer 5 being driven by electric circuit FG. Dispersion A to be cleaned flows into the resonator through inlets 25 and 25' in the direction 55. The particles are forced there to move in a predefined direction. The cleaned dispersion C is drawn off through outlets 26 and 26', whereas enriched dispersion B is drawn off via outlets 31 and 31'. The change in density of the broken lines 1 (number of lines/cm) only represents the change in the density of the particles. The lines do not represent the position of the areas of antinodes or nodes. With flow speeds of 1 cm/s one can typically achieve flow rates of 0.5 m³/h in these arrangements.

In FIG. 14 the central waveguide area $W_a$ of thickness $d_{Wa}$ (approx. 7 to 10 cm) consists of transducer 5, the areas 56 filled with dispersion medium and acoustically transparent walls 54, the two waveguide areas $W_b$ and $W_b'$ having thickness $d_{Wb}$ (approx. 0.5 to 3 cm) and of acoustic mirrors 9 with effective reflection areas 53. The size of the cleaned area 10 is within the magnitude of half an acoustic length $d_s/2$ ($d_s$=5 to 8 cm) of the two separation areas S and S', whereby in this arrangement the separation effect is achieved by a stepwise increase of the resonant frequency (for $f_m$ 2 MHz and a resonator length L of 20 cm the number of half wavelengths in the resonator is approx. 500 to 600).

In contrast to FIG. 14, in FIG. 15 the separation effect is achieved by a stepwise decrease of the resonant frequency, whereby the central waveguide area $W_a$ having thickness $d_{Wa}$ (approx. to 5 mm) only consists of the transducer and the other two waveguide areas $W_b'$ and $W_b'$ and $W='$ having thicknesses $d_{Wb}$ (approx. 3 to 6 cm) now consist of acoustic mirrors 9 with effective reflection areas 53, areas 56 filled with the dispersion medium and the acoustically transparent walls 54. The arrangement and the size of separation areas S and S' are analogous to FIG. 14.

The arrangement of the invention in accordance to FIG. 16 consists of the composite resonator being arranged as a ring resonator 4', in which the deflection of the sound waves into a circulatory path occurs by means of four vessel walls 38, the walls acting as acoustic mirrors 9a-9d, being inclined by 45°, and guaranteeing total reflection, and that said resonator further comprises two unidirectional transducers 34 and 35. These two transducers 34 and 35 are driven at resonant frequencies $f_1$ and $f_2$ which differ only very slightly. Thus a slowly circulating standing wave is formed, said wave moving in directions 19, 19' and 19" respectively and resulting from the superimposition of the two ring waves 36 and 37 of different wavelengths, whereby the ring waves were emitted by the two unidirectional transducers 34 and 35. The standing wave transports particles 1 held in the planes of antinodes 11 and nodes 12 along the ring wave to a zone Z, where they are concentrated. By means of separation wall 39 an improved separation is achieved and thus less influence on the two opposite directions of movement of the ring wave. The dispersion medium 56, e.g. water, is used as coupling liquid 56.

In FIG. 17 a unidirectional transducer is shown which consists of a sandwich resonator 34, two impedance transformation layers 41 and 41' between which a multitude N of layers 40 of the sandwich resonator core is to be found. These N layers are excited via excitation electrodes 43 to which exitation voltages $u_i$ in accordance with equation [6] are applied. The excitation voltages for the discs of the resonator core are applied temporally phase-shifted in such a manner as to allow the formation of only one acoustic wave in direction 42, but not in the opposite direction. The thicknesses of the impedance transformation layers 41 and 41' consist of a quarter or an uneven multitude of a quarter of the wavelengths $\lambda_B$ and $\lambda_C$ in the respective transformation layers 40 and 41. The impedance transformation layers 41 and 41' may be dropped if the total thickness d of N layers 40 is equivalent to half or an integral multiple of half the wavelengths $k\lambda_4/2N$ of the sound frequency in the layer material which was excited by the transducer, and if at the same time the dispersion medium, e.g. water, is chosen as the coupling liquid.

FIG. 18 shows an arrangement of a transducer 5,34 for composite resonator 4,4', consisting of two piezoelectric discs 47,48 having thicknesses $D_1$ and $D_2$, the discs being equivalent to half the wavelength $\lambda_A/2$ of sound wave (3,36) emitted by the transducer 34 and being located at a distance D from each other, the resonator further being filled with a filling material 49 which is similar to dispersion medium 2 or has a similar characteristic acoustic impedance like the medium, and being equal to a quarter of the wavelength $\lambda_F/4$ in the filling material, and whose piezoelectric discs 47,48 comprise electrodes 43 on both sides, the electrodes being driven by alternating voltages $u_1$, $u_2$ and having periodic amplitude modulations which have a temporal shift in phase towards each other of $\pi$, which is equal to $\pi/2$.

We claim:

1. Apparatus for separating dispersed particles by means of applying sound to the dispersion through ultrasonic standing waves in a composite resonator, which composite resonator comprises:
   a vessel containing the dispersion,
   three transducers which each consist of at least one electrically driven, mechanically oscillating element, said electrical driving occurring at a frequency in the neighborhood of the characteristic frequency $f_o$, said transducers being acoustically coupled with said vessel and generating sound waves which form an angle of about 90° to each other, and
   an acoustic mirror system consisting of one or several acoustic mirrors, said mirrors reflecting sound so that standing sound waves may come about which generate sound radiation forces which act on the dispersed particles in the longitudinal direction of the standing waves, said forces driving the particles into the areas of antinodes or areas of nodes of the standing field of sound and holding them there, wherein the highest amplitude $V_{max}$ of the sound particle velocity coming about in the field of sound is adjusted to a value which is slightly smaller than the upper threshold amplitude $V_{max}$ at which the impact pressure forces acting on the dispersed particles, said forces coming about as a consequence of the acoustic flow of the dispersion medium which was generated by the application of sound, are equivalent to the longitudinal holding forces of the dispersed particles in the areas of antinodes or areas of nodes, and wherein the applied frequency of the transducers is turned by means of respective tuning of the electric drive frequency as precisely as possible to one or several of the resonate frequencies $f_n$ of said composite resonator.

2. Apparatus of claim 1, wherein said acoustic mirror system consists of one or several reflector surfaces forming an angle of 90° +/−5° towards each other and which are arranged, with regard to the impinging sound wave, in such a manner that the angle of impact of wave on the reflector surfaces is 45°+/−5°, and that said reflector surfaces consist of a material whose qualities are sufficient for fulfilling the conditions for total reflection of shear waves and longitudinal waves.

3. Apparatus of claim 1, wherein at least one of the mirrors of the acoustic mirror system simultaneously assumes at least partly the function of walls of the vessel.

4. Apparatus of claim 1, wherein said vessel comprises an inlet through which the dispersion to be treated may flow in and an outlet through which dispersion medium may flow out, thus allowing dispersion to flow through vessel more or less normal to the longitudinal direction and holding as well as coagulating the particles in the areas of the antinodes or areas of nodes respectively.

5. Apparatus for separating dispersed particles by means of applying sound to the dispersion through ultrasonic standing waves in a composite resonator, which composite resonator consists in sequence in its longitudinal direction of a first waveguide area, a first separation area, a middle waveguide area, a second separation area, and a third waveguide area, and which composite resonator comprises:

a vessel containing the dispersion, a transducer which consists of at least one electrically driven, mechanically oscillating element, said electrical driving occurring at a frequency in the neighborhood of the characteristic frequency $f_o$ and which transducer is acoustically coupled with said vessel, an acoustic mirror system consisting of one or several acoustic mirrors, said mirrors reflecting sound so that standing sound waves may come about which generate sound radiation forces which act on the dispersed particles in the longitudinal direction of the standing waves, said forces driving the particles into the areas of antinodes or areas of nodes of the standing field of sound and holding them there, an electronic circuit, by which the drive frequency of said transducer is increased, by starting out form a minimum resonant frequency $f_{min}$, of said composite resonator in a stepwise a manner from one resonant frequency $f_n$, of said composite resonator via the respective next resonant frequency $f_{n+1}$ of said composite resonator until, finally, the maximum resonant frequency $f_{max}$ of said composite resonator has been reached, and by which within a delay time $t_T$, which is very small compared to the action period $\Delta t_n = t_{n+1} - t_n$ of the respective frequency $f_n$, it is reverted back to initial frequency $f_{min}$, and by which furthermore said process is repeated in a cyclic manner and the position and the length of the composite resonator such-like that for any step in frequency of $f_n \rightarrow f_{n+1}$, the greatest displacement of a sound antinode area to occur within a separation area is always less than a quarter of the respective initial wavelength, and that the greatest possible displacement of a sound antinode area to occur within a separation area, said displacement belonging to the total frequency deviation $f_{max} - f_{min}$, is greater than one quarter of the mean wavelength.

6. Apparatus for separating dispersed particles by means of applying sound to the dispersion through ultrasonic standing waves in a composite resonator, which composite resonator consists in sequence in its longitudinal direction of a first waveguide area, a first separation area, a middle waveguide area, a second separation area, and a third waveguide area, and which resonator comprises:

a vessel containing the dispersion, a transducer which consists of at least one electrically driven, mechanically oscillating element, said electrical driving occurring at a frequency in the neighborhood of the characteristic frequency $f_o$ and which transducer is acoustically coupled with said vessel, an acoustic mirror system consisting of one or several acoustic mirrors, said mirrors reflecting sound so that standing sound waves may come about which generate sound radiation forces which act on the dispersed particles in the longitudinal direction of the standing waves, said forces driving the particles into the areas of antinodes or areas of nodes of the standing field of sound and holding them there, an electronic circuit, by which the drive frequency of said transducer is decreased, by starting out from a maximum resonant frequency $f_{max}$ of said composite resonator, in a stepwise manner from one resonant frequency $f_n$ of said composite resonator via the respective next resonant frequency $f_{n+1}$ of said composite resonator until, finally, the minimum resonant frequency $f_{min}$ of said composite resonator has been reached, and by which within a delay time $t_T$, which is very small compared to the action period $\Delta t_n = t_{n+1} - t_1$ of the respective frequency $f_n$, it is reverted back to initial frequency $f_{max}$, and by which furthermore said process is repeated in a cyclic manner and the position and the length of each separation area is chosen within the total length of the composite resonator such-like that for any step in frequency of $f_n \rightarrow f_{n+1}$, the greatest displacement of a second antinode area to occur within a separation area is always less than a quarter of the respective initial wavelength, and that the greatest possible displacement of a sound antinode area to occur within a separation area, said displacement belonging to the total frequency deviation $f_{max} - f_{min}$, is greater than one quarter of the mean wavelength.

7. Apparatus of claims 5 or 6, wherein the middle waveguide area comprises the transducer.

8. Apparatus of claims 5 or 6, wherein at least one of the waveguide areas consists of a liquid area containing the dispersion medium and has at least one of its sides acoustically transparent walls.

9. Apparatus of one of claims 5 or 6, wherein sharp tuning to a resonant frequency of the resonator is made by including the electrical impedance, said impedance coming about on the electric contacts of the transducer, in form of an amplitude- and phase-defining band pass filter element within the feedback loop of an oscillator circuit.

10. Apparatus of one of claims 5 or 6, wherein a mean of the minimum resonant frequency $f_{min}$ and the maximum frequency $f_{max}$ resonant frequency is chosen near to a resonant frequency $f_k$ of transducer.

11. Apparatus of one of claims 5, 6, or 16, wherein the vessel comprises an inlet through which the dispersion to be treated may flow in and an outlet through which dispersion medium may flow outlet through which dispersion medium may flow out, thus allowing dispersion to flow through vessel more or less normal to the longitudinal direction the particles in the areas of the antinodes or areas of nodes, respectively.

12. Apparatus of claim 8, wherein the acoustically transparent walls have a wall thickness of n times the half of the wavelength in the wall material at an applied frequency which is the mean of the minimum resonant frequency $f_{min}$ and the maximum resonant frequency $f_{max}$, n being a natural number of the group 1, 2, 3 . . . and that said acoustically transparent walls are made of a material whose characteristic acoustic impedance is nearly equal to the acoustic impedance of the dispersion.

13. Apparatus of claim 8, wherein said acoustically transparent walls have a wall thickness of much smaller than a quarter of the wavelength in the wall material at an applied frequency which is the mean of the minimum resonant frequency $f_{min}$ and the maximum resonant frequency $f_{max}$, and that said acoustically transparent walls are made of a material whose characteristic acoustic impedance is nearly equal to the acoustic impedance of the dispersion.

14. Apparatus of claim 9, wherein said oscillator circuit comprises a controlling device for the amplitude of the voltage on the electrical contacts of transducer, said voltage coming about at the applied resonant frequency.

15. Apparatus of claim 9, wherein said oscillator circuit comprises a controlling device for the amplitude of the power consumption coming about on the electrical contacts of transducer.

16. Apparatus for separating dispersed particles by means of applying sound to the dispersion through ultrasonic standing waves in a composite resonator, which is arranged as ring resonator which comprises:

a vessel containing the dispersion, at least one transducer which consists of at least one electrically driven, mechanically oscillating element generating a first circulating resonant wave of frequency $f_1$ and second circulating resonant wave of frequency $f_2$ moving in an opposite direction, whereby both of said frequencies $f_1$, $f_2$ differ very slightly from each other, said electrical driving occurring at a frequency in the neighborhood of the characteristic frequency $f_0$ and which transducer is acoustically coupled with said vessel, said transducer consisting of at least two piezoelectric discs with thicknesses of n times the half of the wavelength of the sound waves emitted by said transducer, n being a natural number of the group 1, 2, 3, . . . , and said discs are located at a distance from each, said distance being filed with the dispersion medium and being equal to a quarter or an uneven multiple of a quarter of the wavelength in the filling material, and said two piezoelectric discs comprise electrodes on both sides which are excited by alternating voltages and comprise periodic amplitude modulations having a temporal phase shift with regard to each other, said phase shift being equal to $K_2$. II/2, $k_2$ being an uneven number of the group 1, 3 5 . . , and an acoustic mirror system consisting of one or several acoustic mirrors which are arranged in such a manner that the deflection of the resonant ring wave takes place by means of total reflection, said mirrors further reflecting sound so that standing sound waves may come about which generate sound radiation forces, which act on the dispersed particles in the longitudinal direction of the standing waves, said forces driving the particles into the areas of antinodes or areas of nodes of the standing field of sound and holding them there.

17. Method for separating particles which are dispersed in a dispersion medium, whereby in a vessel containing the dispersion an ultrasonic standing wave is generated in a composite resonator, the frequency of which lies in the neighborhood of the characteristic frequency $f_o$, and the highest amplitude V coming about in the sound field is chosen slightly smaller than the upper threshold amplitude $V_{max}$, at which the impact pressure forces acting on particles, said forces coming about as a consequence of the acoustic flow of the dispersion medium which was generated by the application of sound, are equivalent to the longitudinal holding forces acting on dispersed particles located in the areas of antinodes and areas of nodes, and that the frequency with which the composite resonator is driven is tuned as precisely as possible to one of the resonant frequencies $f_n$.

18. Method for separating particles being dispersed in a dispersion medium, whereby in a vessel containing the dispersion an ultrasonic standing wave is generated by a composite resonator, the frequency of which lies in the neighborhood of characteristic frequency $f_o$, whereby in that normal to the direction of a propagation of the waves, lateral forces are generated on particles by means of forming distinct gradients of the particles velocity amplitude V within the areas of antinodes or areas of nodes, whereby said lateral forces show in the direction of rising amplitude V.

19. Method for separating particles being dispersed in a dispersion medium, comprising the following steps:

applying sound to the dispersion through ultrasonic standing waves in a composite resonator which consists in its longitudinal direction of at least one separation area and at least one waveguide area, wherein the frequencies of said sound lie in the neighborhood of the characteristic frequency $f_o$, increasing the drive frequency of said composite resonator by starting out from a minimum resonant frequency $f_{min}$, in a stepwise manner from the one resonant frequency $f_n$ via the respective next resonant frequency $f_{n+1}$ until, finally, the maximum resonant frequency $f_{max}$ has been reached, wherein the position and the length of each separation area is chosen within the total length of the composite resonator such-like that for any step in frequency of $f_n \rightarrow f_{n+1}$, the greatest displacement of a sound antinode area to occur within a separation area is always less than a quarter of the respective initial wavelength, and that the greatest possible displacement of a sound antinode area to occur within a separation area, said displacement belonging to the total frequency deviation $f_{max}-f_{min}$, is greater than one quarter of the mean wavelength, reverting back to initial frequency $f_{min}$ within a delay time $t_T$, which is very small compared to the action period $\Delta t_n = t_{n+1} - t_n$ of the respective frequency $f_n$, repeating this process in a cyclic manner.

20. Method for separating particles being dispersed in a dispersion medium, comprising the following steps:

applying sound to the dispersion through ultrasonic standing waves in a composite resonator which consists in its longitudinal direction of at least one separation area and at least one waveguide area, wherein the frequencies of said sound lie in the neighborhood of the characteristic frequency $f_o$, decreasing the drive frequency of said composite resonator by starting out from a maximum resonant frequency $f_{max}$, in a stepwise manner from the one resonant frequency $f_n$ via the respective next resonant frequency $f_{n+1}$ until, finally, the minimum resonant frequency $f_{min}$ has been reached, wherein the position and the length of each separation area is chosen within the total length of the composite resonator such-like that for any step in frequency of $f_n \rightarrow f_{n+1}$, the greatest displacement of a sound antinode area to occur within a separation area is always less than a quarter of the respective initial wavelength, and that the greatest possible displacement of a sound antinode area to occur within a separation area, said displacement belonging to the total frequency deviation $f_{max} - f_{min}$, is greater than one quarter of the mean wavelength, reverting back to initial frequency $f_{max}$ within a delay time $t_T$, which is very small compared to the action period $\Delta t_n = t_{n+1} - t_n$ of the respective frequency $f_n$, repeating this process in a cyclic manner.

21. Method of one of claim 19 or 20, wherein a median of the minimum resonant, frequency $f_{min}$ and the maximum frequency $f_{max}$ resonant frequency is chosen near to a resonant frequency $f_k$ of the transducer.

* * * * *

UNITED STATES PATENT AND TRADEMARK OFFICE
CERTIFICATE OF CORRECTION

PATENT NO. : 5,225,089

DATED : July 6, 1993

INVENTOR(S) : Ewald Benes and Ferdinand Hager

It is certified that error appears in the above-identified patent and that said Letters Patent is hereby corrected as shown below:

On title page, item
[30] Foreign Application Priority Data

Nov. 3, 1988 [AT] Austria........................2712/88

Signed and Sealed this

Eighteenth Day of January, 1994

Attest:

BRUCE LEHMAN

*Attesting Officer*  *Commissioner of Patents and Trademarks*